(12) United States Patent
Morikawa et al.

(10) Patent No.: US 6,260,766 B1
(45) Date of Patent: Jul. 17, 2001

(54) HEATING APPARATUS FOR VEHICLE

(75) Inventors: Toshio Morikawa, Toyota; Hajime Ito, Kariya; Toshinao Aoki, Okazaki; Sadahisa Onimaru, Chiryu; Mitsuo Inagaki, Okazaki; Hirohito Matsui, Okazaki; Masaru Tsunokawa, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/286,573

(22) Filed: Apr. 5, 1999

(30) Foreign Application Priority Data

| Apr. 7, 1998 | (JP) | 10-094875 |
| Jan. 28, 1999 | (JP) | 11-020521 |
| Jun. 5, 1999 | (JP) | 11-059255 |

(51) Int. Cl.$^7$ .................................................. B60H 1/02
(52) U.S. Cl. ............................ 237/12.3 R; 237/12.3 B; 126/247; 122/26
(58) Field of Search ................ 237/12.3 B, 12.3 R; 122/26; 126/247

(56) References Cited

U.S. PATENT DOCUMENTS

| 4,726,325 | * | 2/1988 | Itakura | 123/41.1 |
| 4,993,377 | * | 2/1991 | Itakura | 123/142.1 R |
| 5,775,583 | | 7/1998 | Braatz et al. | |

FOREIGN PATENT DOCUMENTS

| 58-33508 | 2/1983 | (JP) . |
| 63-50713 | 4/1988 | (JP) . |
| 3-57877 | 3/1991 | (JP) . |

* cited by examiner

Primary Examiner—Harold Joyce
Assistant Examiner—Derek S. Boles
(74) Attorney, Agent, or Firm—Harness, Dickey & Pierce, PLC

(57) ABSTRACT

A heating apparatus for a vehicle includes a pump for circulating cooling water in a cooling water circuit, a heating heat exchanger for heating air blown into a passenger compartment of the vehicle using cooling water as a heating source, and a throttle valve disposed at a discharge side of the pump. In the heating apparatus, when the temperature of cooling water is low and heating capacity for heating the passenger compartment is insufficient, an opening degree of the throttle valve is reduced by a control unit. Therefore, heat is generated from the throttle valve and the pump so that the temperature of cooling water is increased. Thus, heating capacity of the heating apparatus can be improved without using a manual operation.

18 Claims, 17 Drawing Sheets

HEATING APPARATUS FOR VEHICLE

CROSS-REFERENCE TO RELATED APPLICATION

This application is related to and claims priority from Japanese Patent Application No. Hei. 10-94875 filed on Apr. 7, 1998, No. Hei. 11-20521 filed on Jan. 28, 1999, and No. Hei. 11-59255 filed on Mar. 5, 1999, the contents of which are hereby incorporated by reference.

BACKGROUND OF THE INVENTION

1. Field of the Invention

The present invention relates to a heating apparatus for a vehicle. The heating apparatus is suitable for a vehicle having a diesel engine or a lean burn engine, for example.

2. Description of Related Art

In a conventional heating apparatus for a vehicle, a passenger compartment is heated using cooling water for cooling an engine of the vehicle as a heating source. However, in a vehicle having a diesel engine or a lean burn engine, the passenger compartment cannot be sufficiently heated by cooling water of the engine.

To overcome this problem, in a heating apparatus disclosed in JP-U-63-50713, a pump is operatively linked with a vehicle wheel, a throttle member is disposed at a fluid-discharge portion of the pump in a loop-like fluid passage, and throttle state of the throttle member is switched by a manually operated lever. In the heating apparatus, because the lever for changing the throttle state of the throttle member is manually operated, the lever operation is troublesome and is difficult to be accurately controlled. Further, because an opening degree of the throttle member is decreased so that the temperature of fluid is increased, an amount of fluid flowing through the throttle member is decreased, thereby decreasing heating capacity of the heating apparatus.

SUMMARY OF THE INVENTION

In view of the foregoing problems, it is a first object of the present invention to provide a heating apparatus for a vehicle, which can provide a sufficient heating capacity without using a manually operated lever, even when temperature of fluid circulating in a fluid circuit is low.

It is a second object of the present invention to provide a heating apparatus having a first pump and a second pump, which can prevent a flow amount of fluid circulating in a fluid circuit from being greatly decreased while effectively improving heating capacity.

According to the present invention, a heating apparatus for a vehicle includes a pump unit for circulating fluid in a fluid circuit, a heat exchanger for heating air blown into a passenger compartment of the vehicle by using the fluid for cooling a driving source of the vehicle as a heating source, a throttle member for adjusting an opening degree of a fluid passage of the fluid circuit, a determining unit for determining whether or not it is necessary to change temperature of fluid circulating in the fluid circuit, and a throttle control unit for controlling the throttle member. In the heating apparatus, when the determining unit determines that it is necessary to increase the temperature of fluid in the fluid circuit, the throttle control unit controls the throttle member to reduce the opening degree of the fluid passage of the fluid circuit. Thus, even when the temperature of fluid circulating in the fluid circuit is low, the heating apparatus can provide a sufficient heating capacity without using a manually operated lever.

Preferably, the pump unit includes a first pump driven by the driving source of the vehicle, and a second pump disposed separately from the first pump. Therefore, the heating apparatus can improve heating capacity while preventing fluid circulating in the fluid circuit from being greatly decreased.

More preferably, the throttle member is disposed at a fluid discharge side of the second pump. Therefore, fluid circulating in the fluid circuit is effectively increased while the temperature of fluid is increased.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

Figure 1:
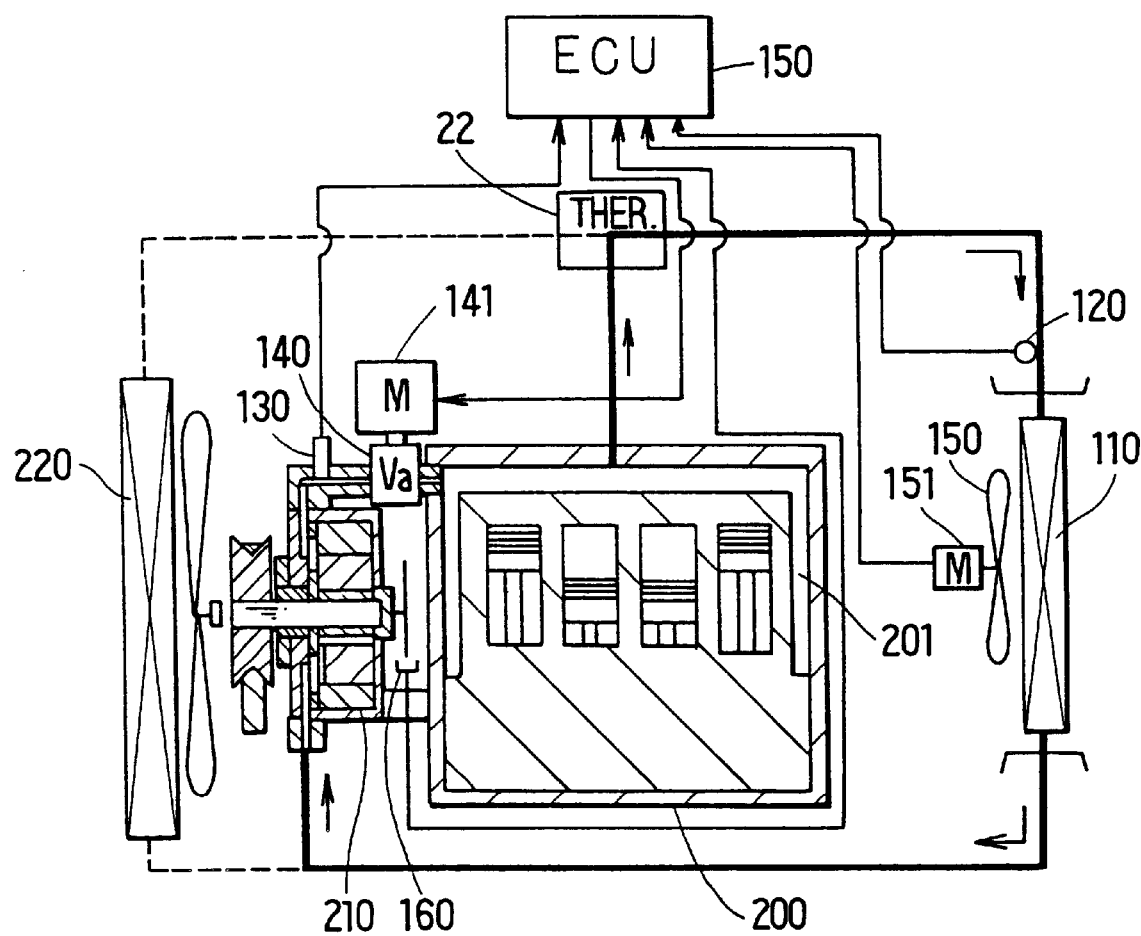
FIG. 1 is a schematic diagram showing a heating apparatus for a vehicle according to a first preferred embodiment of the present invention.
Figure 2A:
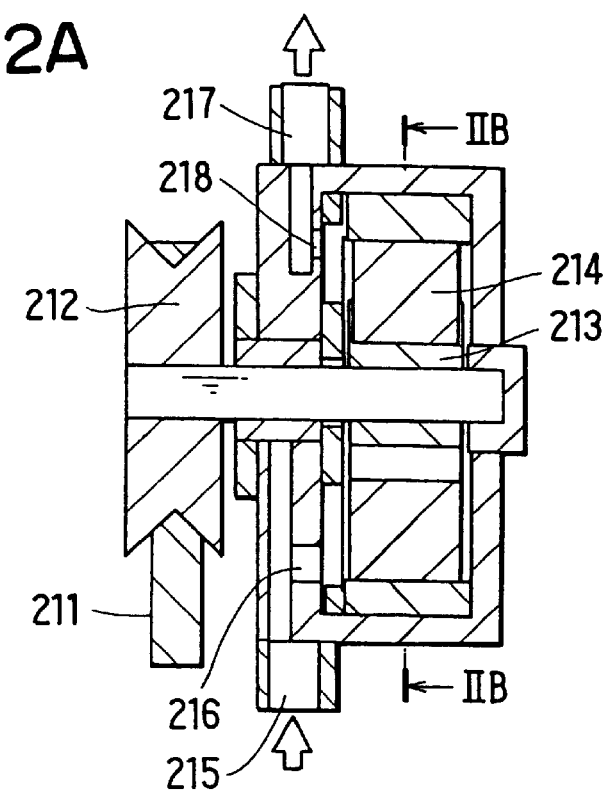
FIG. 2A is a sectional view showing a pump of the heating apparatus according to the first embodiment.
Figure 2B:
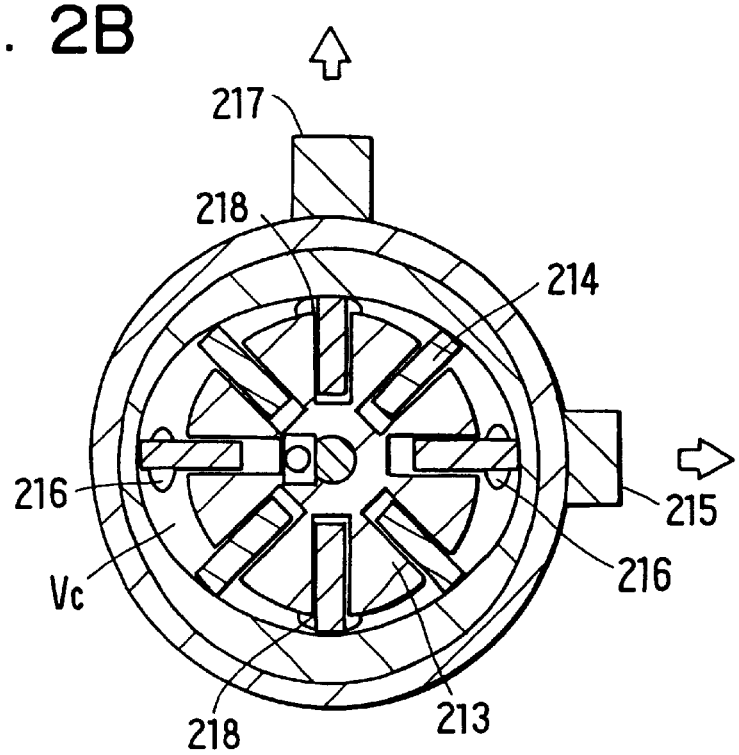
FIG. 2B is a cross-sectional view taken along line IIB—IIB in FIG. 2A.

A first preferred embodiment of the present invention will be now described with reference to FIGS. 1–6. As shown in FIG. 1, a water-cooled engine 200 for driving a vehicle is disposed in an engine compartment of the vehicle, and cooling water for cooling the engine 200 is compulsorily circulated in a cooling water circuit by a water pump 210. The pump 210 is a movable vane type pump of a volume type pump. As shown in FIGS. 2A, 2B, the pump 210 has a rotor 213 rotated by the engine 200 through a V-belt 211 and a pulley 212, and a vane 214 frequently appearing from the rotor 213 with a rotation of the rotor 213. The rotor 213 and the vane 214 are accommodated within an operation chamber Vc of the pump 210. The pump 210 sucks and compulsorily plums cooling water by increasing and decreasing a volume of the operation chamber Vc.

Further, as shown in FIG. 2A, the pump 210 has a suction port 215 connecting to outlet sides of a radiator 220 and a heater core 110. Cooling water sucked from the suction port 215 communicates with the operation chamber Vc through a first communication port 216. A discharge port 217 for discharging the pumped water is coupled to a water jacket 201, and communicates with the operation chamber Vc through a second communication port 218.

As shown in FIG. 1, cooling water circulating in the cooling water circuit is cooled by the radiator 220, and an amount of cooling water flowing into the radiator 220 is adjusted by a thermostat 221. In the cooling water circuit, cooling water pumped from the pump 210 flows into the heater core (i.e., heating heat exchanger) 110 for heating a passenger compartment of the vehicle, and a water temperature sensor 120 for detecting temperature of cooling water flowing into the heater core 110 is disposed at an upstream side of the heater core 110 in a water flow direction.

Pressure of cooling water discharged from the pump 210 is detected by a pressure sensor 130. A throttle valve (energy-changing unit) 140 for controlling an opening degree (i.e., throttle degree) of a water passage is disposed in the cooling water circuit at a downstream side of the pressure sensor 130 in the water flow direction. The opening degree of the throttle valve 140 can be variably controlled by an electronic control unit (ECU) 150 through a driving unit 141 such as a servomotor.

In the first embodiment, air is blown toward the heater core 110 by a blower 152, and the blower 152 is operated by an electrical motor 151. voltage applied to the electrical motor 151, signals from the sensors 120, 130, and a rotation speed Np of the pump 210, detected by a rotation sensor 160, are input into the ECU 150. Therefore, the ECU 150 calculates based on a pre-set program, and outputs signals to control the blower 152, the throttle valve 140 and the pump 210.

Next, operation of a heating apparatus for a vehicle according to the first embodiment of the present invention will be now described. The operation of the throttle valve 140 is controlled in accordance with the flow diagram shown in FIG. 3, and a target pressure Pc for controlling the throttle valve 140 is calculated based on the flow diagram shown in FIG. 4.

Figure 3:
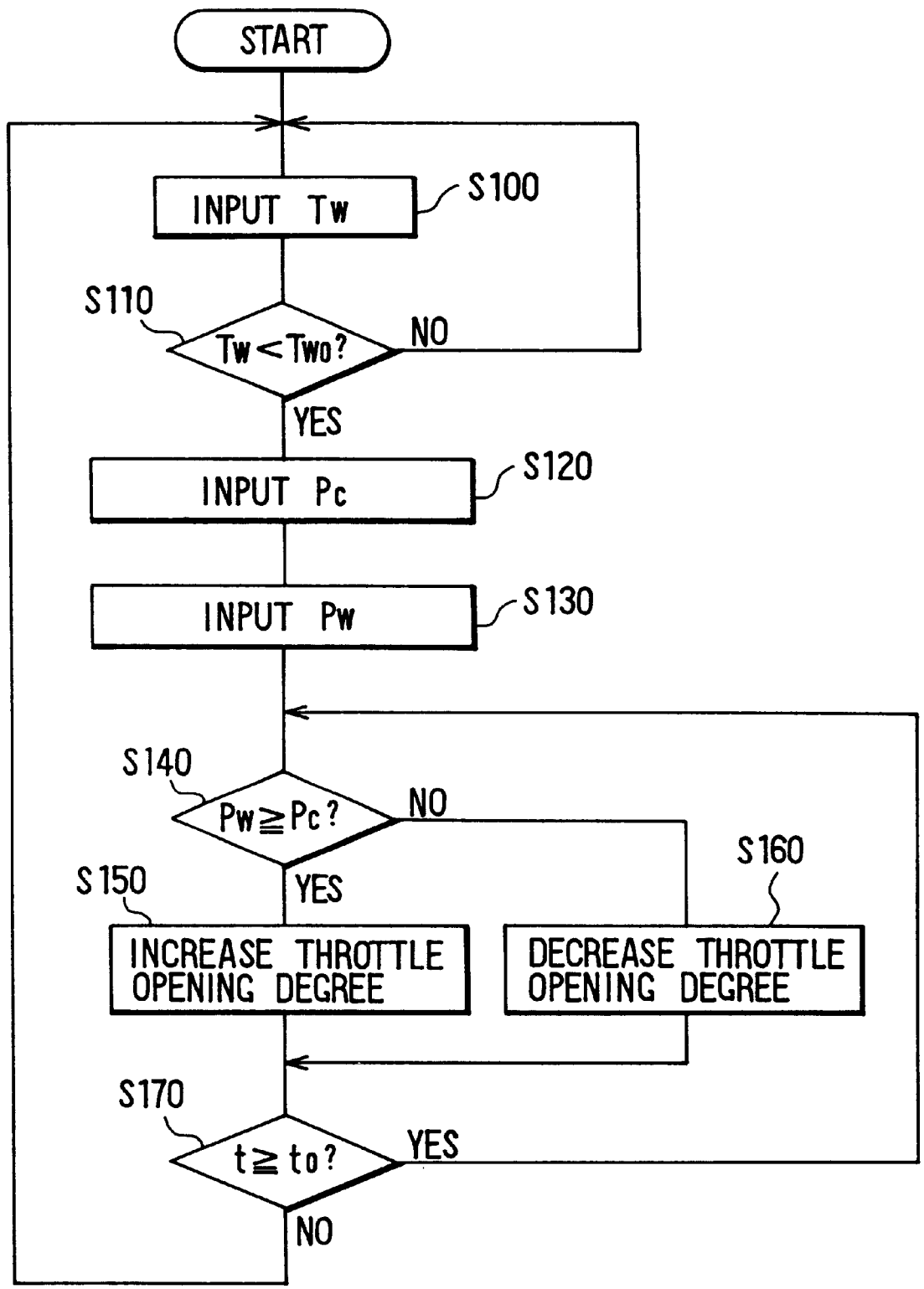
FIG. 3 is a flow diagram for controlling an opening degree of a throttle valve according to the first embodiment.
Figure 4:
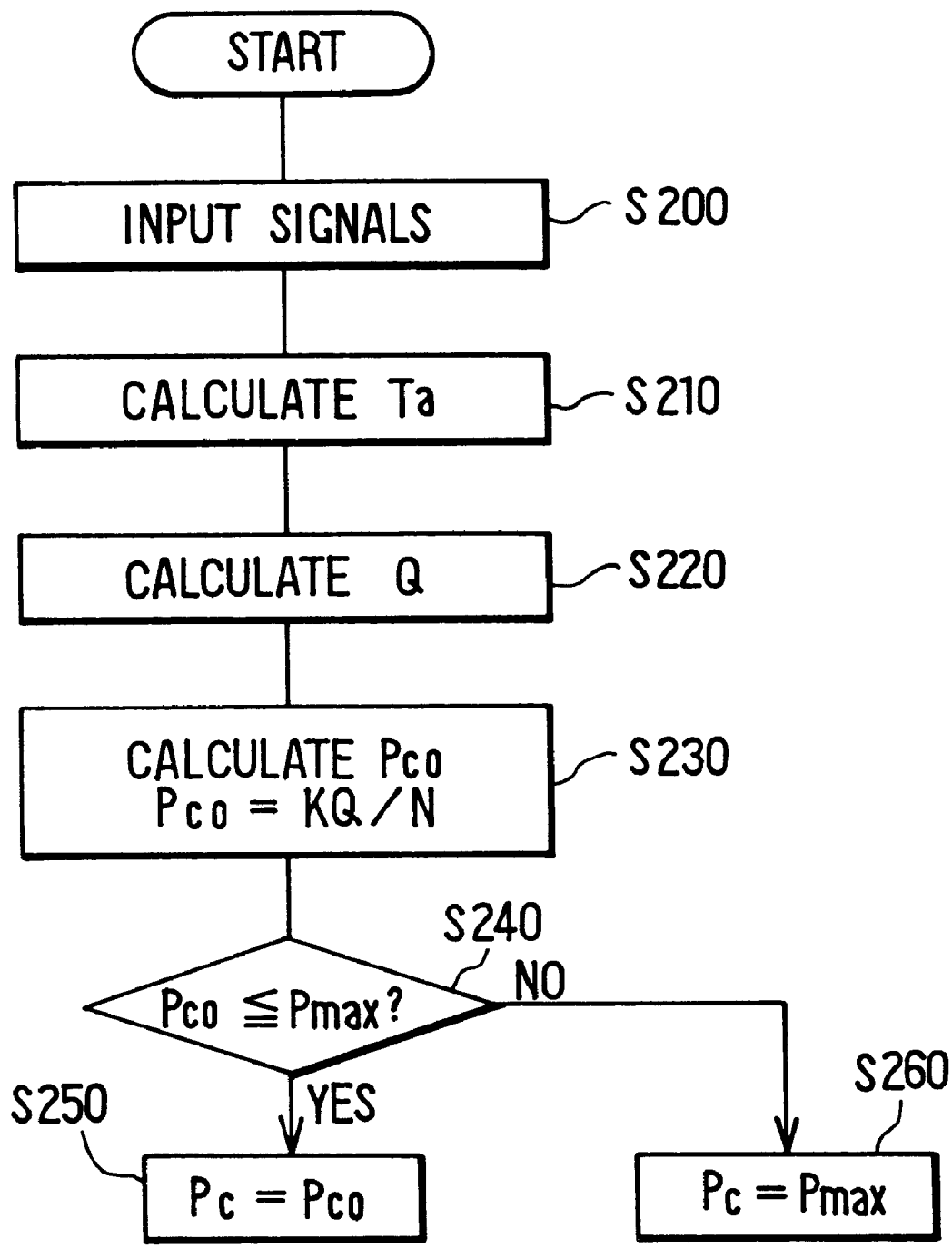
FIG. 4 is a flow diagram for calculating a target pressure of cooling water discharged from the pump, in the flow diagram of FIG. 3.

As shown in FIG. 3, when a heating switch (not shown) for the heating apparatus is turned on after the engine 200 is operated, water temperature Tw detected by the temperature sensor 120 is input at step S100. At step S110, it is determined whether or not the water temperature Tw is lower than a predetermined temperature Two (e.g., 80° C.). When the water temperature Tw is equal to or higher than the predetermined temperature Two, the program returns to step S100. On the other hand, when the water temperature Tw is lower than the predetermined temperature Two, the target pressure Pc calculated in the flow diagram shown in FIG. 4 is input at step S120, and water pressure Pw detected by the pressure sensor 130 is input at step S130.

Next, at step S140, it is determined whether or not the water pressure Pw detected by the pressure sensor 130 is equal to or larger than the target pressure Pc. When the water pressure Pw detected by the pressure sensor 130 is equal to or larger than the target pressure Pc at step S140, the opening degree of the throttle valve 140 is increased by a predetermined degree at step S150, so that the discharge pressure of water from the pump 210 is decreased. Here, when the throttle valve 140 is fully opened, the fully opening state of the throttle valve 140 is maintained at step S150. On the other hand, when the water pressure Pw detected by the pressure sensor 130 is smaller than the target pressure Pc, the opening degree of the throttle valve 140 is decreased by a predetermined opening degree at step S160, so that the discharge pressure of water from the pump 210 is increased. At step S170, it is determined whether or not a time "t" after starting the throttle control operation is equal "to" or longer than a predetermined time to. When the time "t" after starting the throttle control operation is shorter than the predetermined time "to", i.e., when the time "t" does not pass through the predetermined time "to", the operations of steps S140–S170 is repeated so that the water pressure Pw becomes equal to the target pressure Pc. When the time "t" is passes through the predetermined time "to", the program returns to step S100.

While the opening degree control (i.e., throttle control) of the throttle valve 140 is performed so that the water pressure Pw becomes equal to the target pressure Pc, the water temperature Tw is changed. To prevent the target pressure Pc from being calculated based on water temperature Tw greatly different from an actual water temperature, the operations of steps S140–S170 is repeated in the first embodiment.

When the heating switch of the heating apparatus is turned off, the throttle valve 140 is fully opened to have a fully opening degree, and the throttle control of the throttle valve 140 is finished.

Next, the target pressure Pc is calculated and is determined based on the flow diagram shown in FIG. 4. At step S200 in FIG. 4, signals from an air-blowing amount V determined by voltage applied to the electrical motor 151, and a rotation speed Np detected by the rotation sensor 160 are input. At step S210, air temperature Ta after immediately passing through the heater core 110 is calculated according to the water temperature Tw and the air-blowing amount v based on a pre-stored map (not shown) in the ECU 150. Further, at step S220, a necessary heating quantity Q of the heating apparatus for heating the passenger compartment is calculated according to a difference between a pre-stored set temperature (e.g., 50° C.) and the air temperature Ta. Next, at step S230, a temporary target pressure Pco is calculated based on a formula of Pco=K.Q/N. Here, "k" indicates a constant obtained from experiments and the like. The constant "k" also includes heating quantity generated due to increased cooling loss of the engine 200.

Next, at step S240, it is determined whether or not the temporary target pressure Pco is equal to or smaller than a set maximum target pressure Pmax at step S240. When the temporary target pressure Pco is not larger that the set maximum target pressure Pmax (i.e., Pco≦Pmax), the target pressure Pc is set to the temporary target pressure Pco (i.e., Pc=Pco) at step S250. On the other hand, when temporary target pressure Pco is larger that the set maximum target pressure Pmax (i.e., Pco>Pmax), the target pressure Pc is set to the set maximum target pressure Pmax (i.e., Pc=Pmax). In the first embodiment, the maximum target pressure is set to protect the pump 210 so that pressure of water discharged from the pump 210 is not excessively increased.

Figure 5:
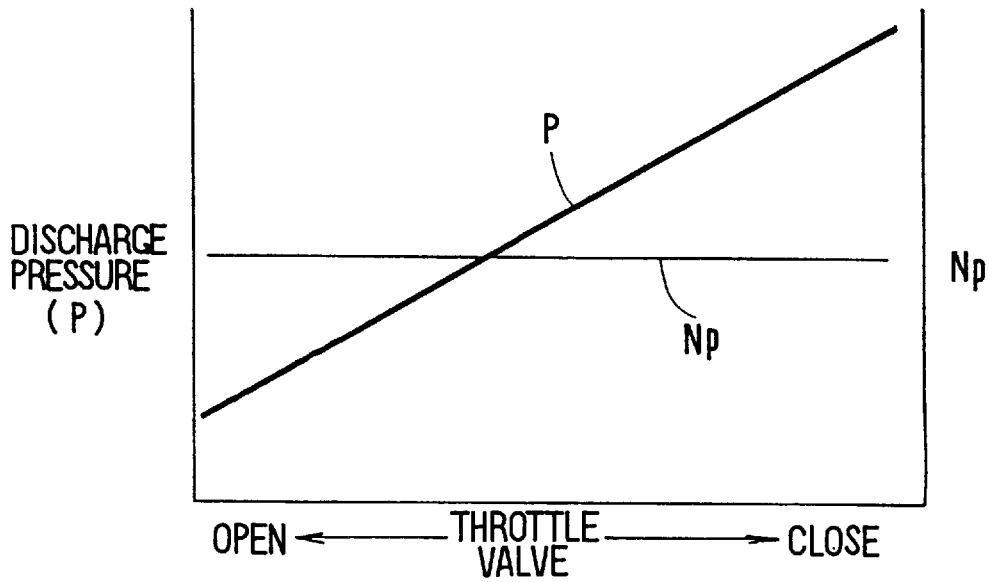
FIG. 5 is a graph showing the relationship between an opening degree of the throttle valve, a discharge pressure (P) of cooling water and a rotation speed Np of the pump, according to the first embodiment.
Figure 6:
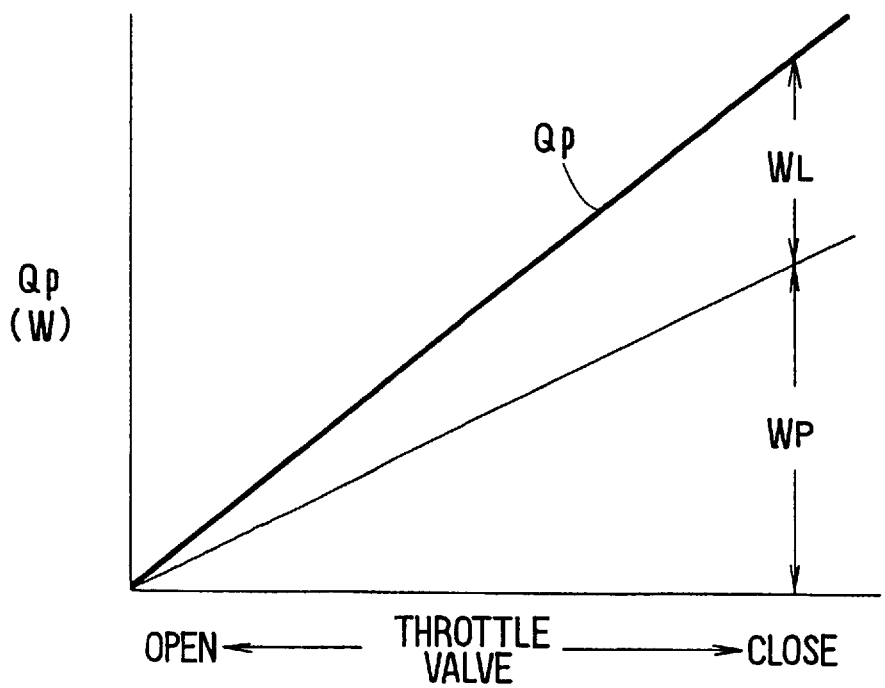
FIG. 6 is a graph showing the relationship between the opening degree of the throttle valve and heat-generating amount Qp from the pump according to the first embodiment.

According to the first embodiment of the present invention, when the opening degree of the throttle valve 140 becomes smaller, i.e., when the water passage from the pump 210 is throttled by the throttle valve 140, pressure "P" of water discharged from the pump 210 is increased, as shown in FIG. 5. Therefore, pressure loss ΔP in the throttle valve 140 becomes larger, and pump output power Wp consumed in the throttle valve 140 becomes larger as shown in FIG. 6. That is, pump output power Wp changed into heat in the throttle valve 140 becomes larger. Here, the pump output power Wp changed into heat in the throttle valve 140 due to the pressure loss ΔP is obtained by the formula of Wp=Fw×ΔP, in which Fw is a flow amount of water flowing through the throttle valve 140.

Thus, as the necessary heating quantity Q of the heating apparatus becomes larger, the target pressure Pc is made larger, and the opening degree of the throttle valve 140 is made smaller. Therefore, the pump output power Wp changed into heat energy becomes larger, the temperature Tw of water is increased, and heating capacity of the heating apparatus is increased even when heat generated from the engine 200 is small.

Further, when the opening degree of the throttle valve 140 becomes smaller and the pressure loss ΔP becomes larger, inner energy loss WL (i.e., pump inner loss WL) of the pump 210 also becomes larger, as shown in FIG. 6. Therefore, the pump inner loss WL is changed into heat energy. That is, an entire heating quantity Qp generated from the pump 210 includes the heat energy changed from the pump output power Wp and the heat energy due to the pump inner loss WL. Therefore, the heating apparatus can provide a sufficient heating capacity even water temperature Tw due to heat generated from the engine 200 is low.

In the first embodiment of the present invention, the pump output power Wp and the pump inner loss WL are not respectively independently controlled. As shown in FIG. 6, when the opening degree of the throttle valve 140 becomes smaller, the pump output power Wp becomes larger, and therefore, the pump inner loss WL also becomes larger with the increase of the pump output power Wp. Further, with the increase of the pump output power Wp, power (heat) generated from the engine 200 is also increased, thereby increasing the water temperature Tw.

According to the first embodiment of the present invention, because the pump 210 mounted on the vehicle is used for improving heating capacity of the heating apparatus, attachment performance of the heating apparatus onto the vehicle can be improved. Further, the heating capacity of the heating apparatus is improved by simply controlling the opening degree of the throttle valve 140. By controlling the opening degree of the throttle valve 140 using the ECU 150, pressure loss ΔP and the pump output power Wp can be readily cooperatively controlled, and the heating capacity of the heating apparatus can be accurately controlled.

According to the first embodiment of the present invention, when the temperature of cooling water is lower than a predetermined temperature and heating capacity of the heating apparatus is insufficient, the opening degree of the throttle valve 140 disposed at the discharge side of the pump 210 is made smaller by using the ECU 150. That is, in the heating apparatus, when it is necessary to increase the temperature of cooling water in the cooling water circuit, the opening degree of the throttle valve is decreased. Therefore, the heating capacity of the heating apparatus can be increased without a manually operated lever. Thus, the heating capacity of the heating apparatus can be accurately simply controlled without the manually operated lever.

A second preferred embodiment of the present invention will be now described with reference to FIGS. 7–11.

Figure 7:
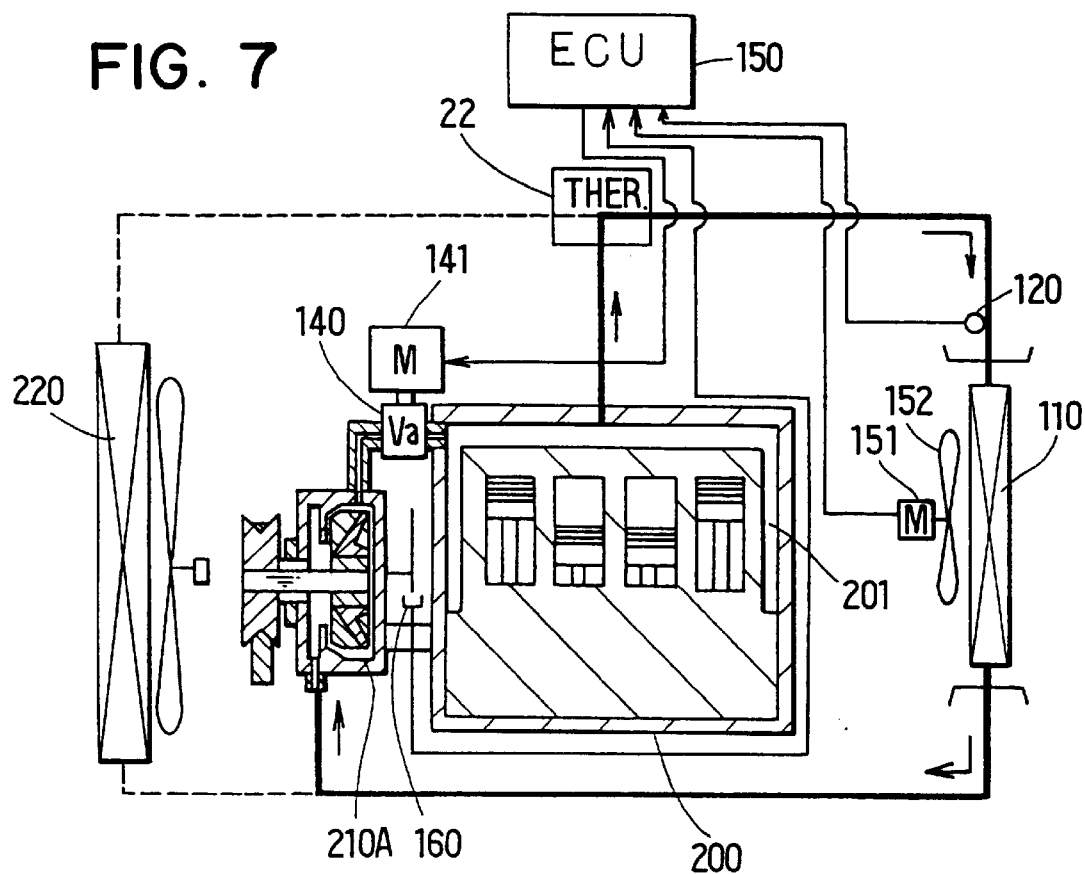
FIG. 7 is a schematic diagram showing a heating apparatus for a vehicle according to a second preferred embodiment of the present invention.
Figure 8:
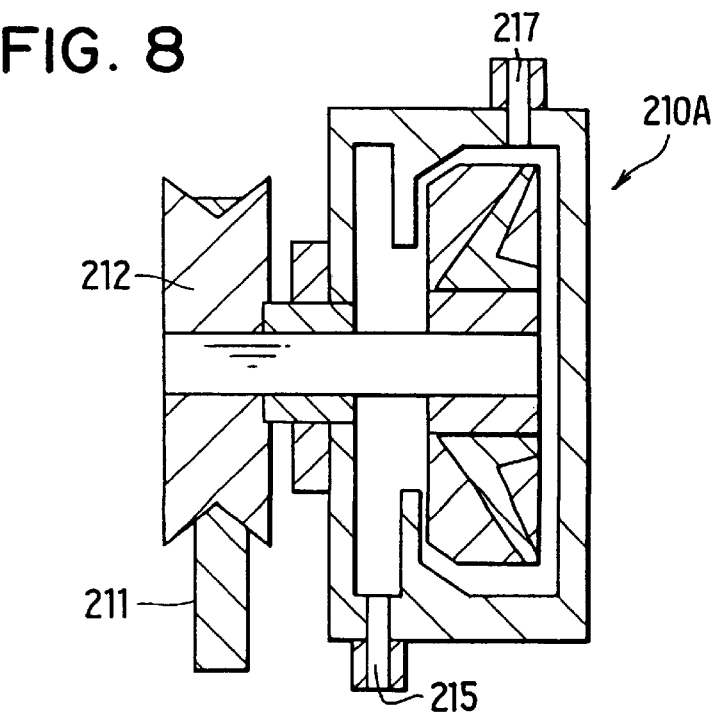
FIG. 8 is a cross-sectional view of a pump of the heating apparatus according to the second embodiment.

As shown in FIGS. 7 and 8, in the second embodiment of the present invention, a volute centrifugal pump (hereinafter referred to as centrifugal pump) 210A is used, and the pressure sensor 130 of the first embodiment is omitted. In the centrifugal pump 210A, water flowing from an approximate center of an impeller is discharged to a radial outside by a centrifugal force. In the second embodiment, the components similar to those in the first embodiment are indicated to the same reference numbers, and the explanation thereof is omitted.

Figure 9:
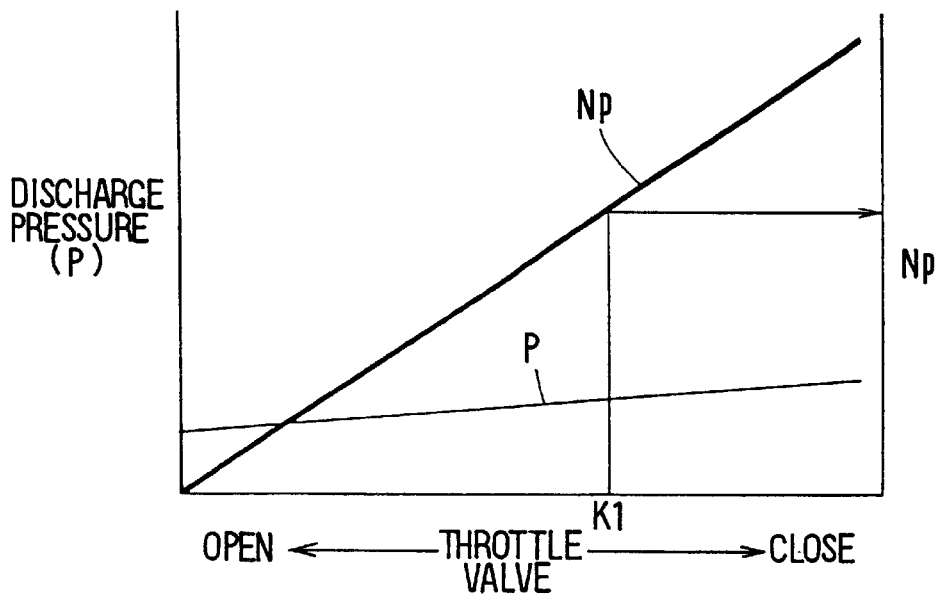
FIG. 9 is a graph showing the relationship between an opening degree of the throttle valve, a discharge pressure (P) of cooling water and a rotation speed Np of the pump, according to the second embodiment.

In the above-described volume type pump 200 of first embodiment, the discharged water amount is proportional to the 5 rotational speed of the pump 200. However, the centrifugal pump 210A is different from the volume pump 210. When the pressure loss at the discharge side of the centrifugal pump 210A becomes larger while the rotation speed of the centrifugal pump 210A is constant, the discharge amount of water from the centrifugal pump 210A is decreased. Therefore, in the centrifugal pump 210A, as the opening degree of the throttle valve becomes smaller and the pressure loss AP becomes larger, the rotation speed of the centrifugal pump 210A is increased so that the discharge amount of water from the centrifugal pump 210A is maintained at a constant amount. FIG. 9 shows the relationship between the opening degree of the throttle valve, and the discharge pressure P and the rotation speed Np, when the flow amount of water discharged from the centrifugal pump 210A is set to be constant.

Further, when the pressure loss ΔP at the discharge side of the centrifugal pump 210A becomes larger, the flow amount Fw from the centrifugal pump 210A is decreased.

Figure 10:
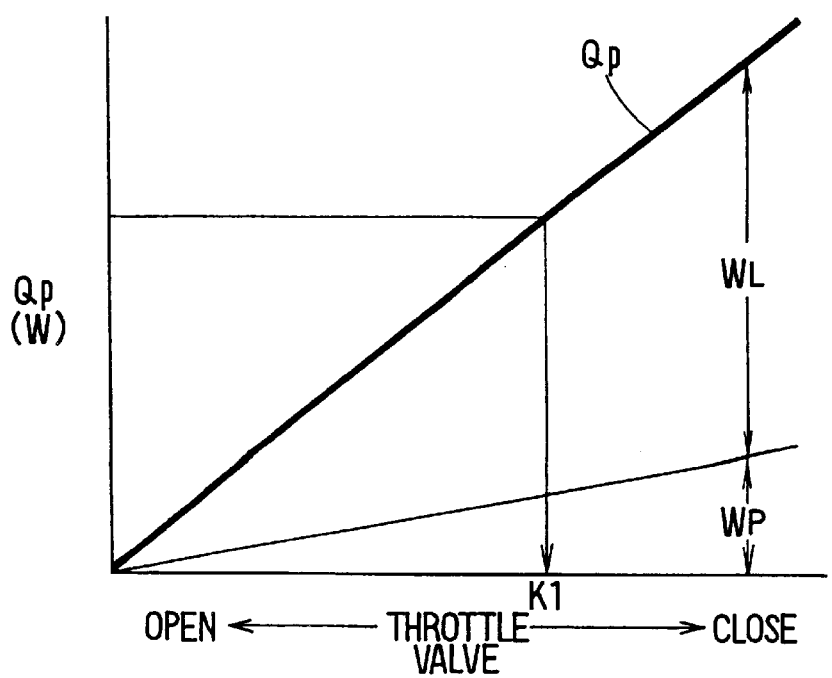
FIG. 10 is a graph showing the relationship between the opening degree of the throttle valve and heat-generating amount Qp from the pump according to the second embodiment.

Therefore, as shown in FIG. 10, it is compared with the volume type pump 200 of the first embodiment, the generated heat amount in the throttle valve 140 from the pump output power Wp becomes smaller than the generated heat amount due to the pump inner loss $W_L$ within the entire heating quantity Qp generated the centrifugal pump 210A.

In the second embodiment, the opening degree of the throttle valve 140 and the flow amount of water passing through the throttle valve 140 are controlled based on the necessary heating quantity Q of the heating apparatus. That is, the flow amount of water discharged from the centrifugal pump 210A and the rotation speed Np of the centrifugal pump 210A are controlled based on the necessary heating quantity Q. According to the necessary heating quantity Q of the heating apparatus, a corresponding opening degree K1 of the throttle valve 140 is obtained based on the graph shown in FIG. 10, and a corresponding rotation speed Np of the pump 210A is also obtained based on graph shown in FIG. 9.

Figure 11:
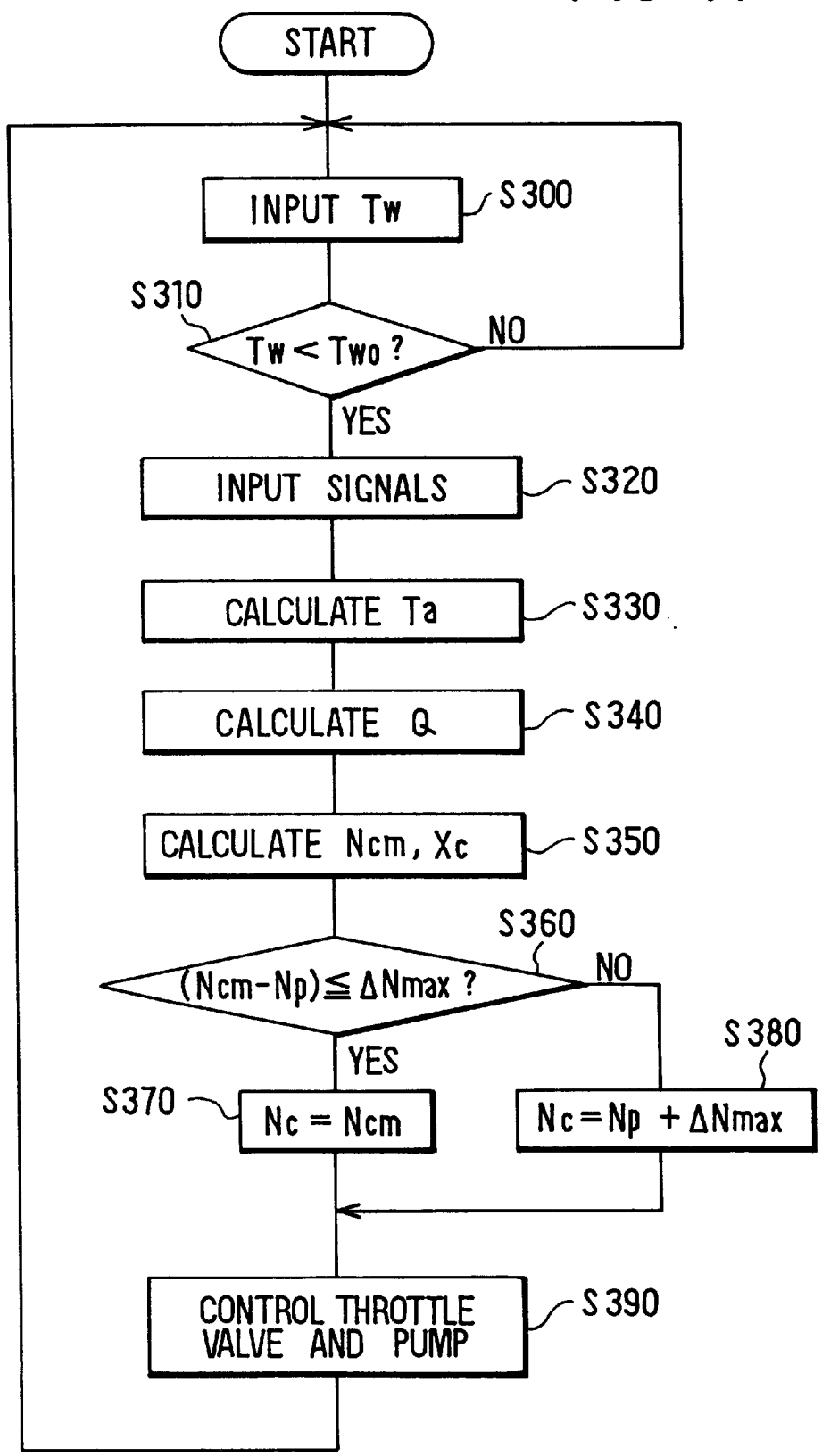
FIG. 11 is a flow diagram showing a control process of the heating apparatus according to the second embodiment.

Next, the control of the throttle valve 140 according to the second embodiment of the present invention is performed based on the flow diagram shown in FIG. 11. When the heating switch of the heating apparatus is turned on after the engine 200 is operated, the water temperature Tw detected by the temperature sensor 120 is input into the ECU 150 at step S300. At step S310, it is determined whether or not the water temperature Tw detected by the temperature sensor 120 is lower than a predetermined temperature Two. When the water temperature Tw is equal to or higher than the predetermined temperature Two, the program returns to step S300. On the other hand, when the water temperature Tw is lower than the predetermined temperature Two, signals from the air-blowing amount V of the blower 152 and the rotation number Np of the centrifugal pump 210A are input at step S320. At step S330, the temperature Ta of air immediately after passed through the heater core 110 is calculated similarly to the first embodiment. Next, the necessary heating quantity Q of the heating apparatus for heating the passenger compartment is calculated based on the difference between the calculated temperature Ta and a pre-set temperature Tao (e.g., 50° C.), at step S340. Further, at step S350, a temporary target rotation speed Ncm of the centrifugal pump 210A and a target opening degree Xc of the throttle valve 140 are calculated according to the necessary heating quantity Q based on the graphs shown in FIGS. 9, 10.

At step S350, it is determined whether or not a rotation speed difference ΔN between the temporary target rotation speed Ncm and the rotation speed Np detected by the rotation speed sensor 160 is equal to or lower than a predetermined rotation speed difference $\Delta N_{max}$. When the difference ΔN is equal to or lower than the predetermined difference $\Delta N_{max}$, the target rotation speed Nc is set to the temporary target rotation speed Ncm at step S370. On the other hand, when the difference ΔN is larger than the predetermined difference $\Delta N_{max}$, the target rotation speed Nc is set to (Np+$\Delta N_{max}$), at step S380. Thereafter, the driving motor 141 is controlled so that the opening degree of the throttle valve 140 is set to the target opening degree Xc, and an opening degree of a throttle valve (not shown) of the engine 200 is controlled so that the rotation speed of the centrifugal pump 210A is set to the target rotation speed Nc, at step S380.

In the second embodiment of the present invention, the predetermined rotation speed difference $\Delta N_{max}$ is set to prevent the discharge pressure of water from the pump 210A and the rotation speed of the engine 200 from being excessively increased. When the water temperature Tw is lower than the predetermined temperature Two, the rotation speed of the engine 200 is generally low. Therefore, in this case, the rotation speed difference ΔN is not set to minus.

A third preferred embodiment of the present invention will be now described with reference to FIGS. 12, 13. In the third embodiment, the components similar to those in the first embodiment are indicated to the same reference numbers, and the explanation thereof is omitted.

Figure 12:
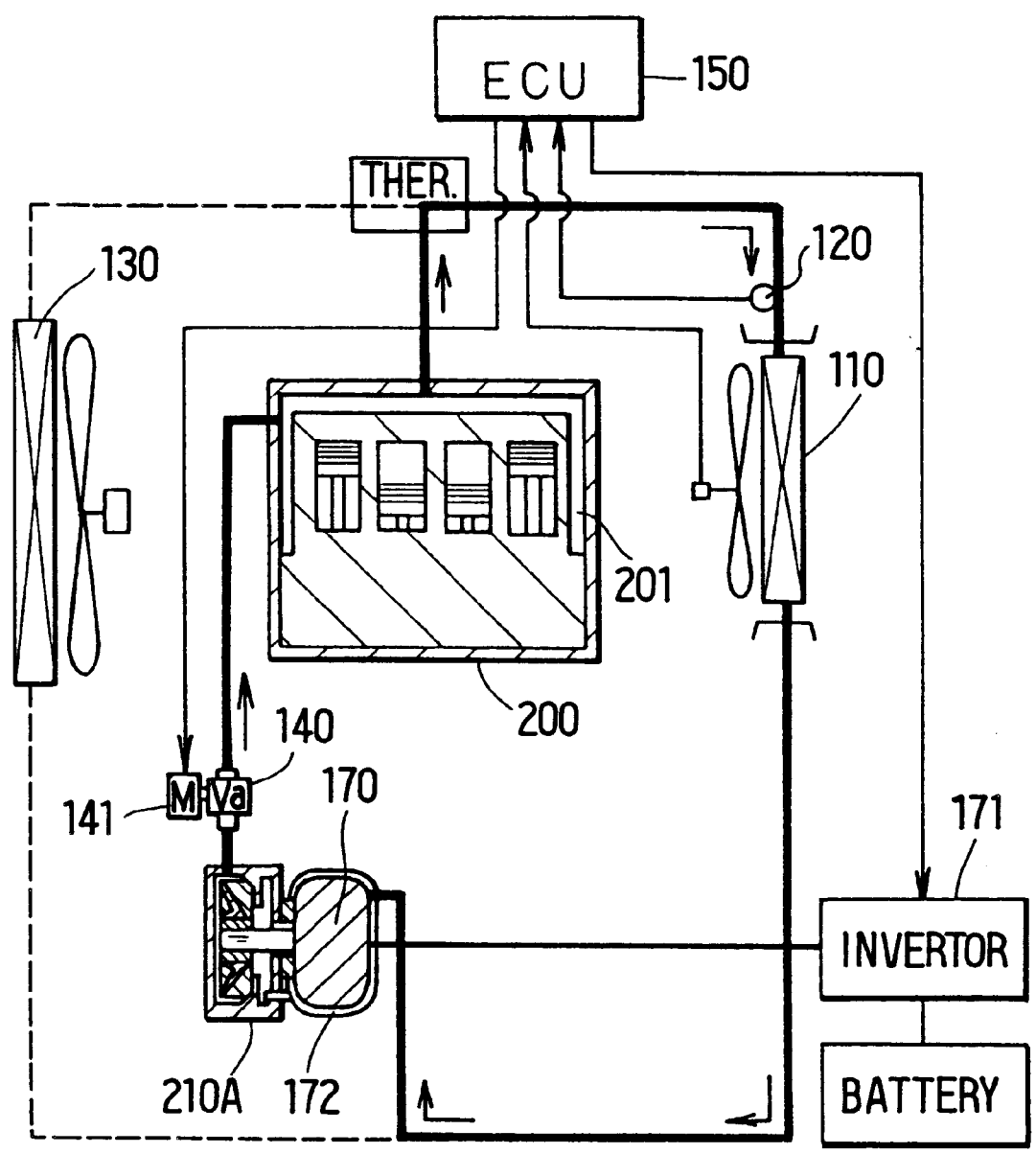
FIG. 12 is a schematic diagram showing a heating apparatus for a vehicle according to a third preferred embodiment of the present invention.
Figure 13:
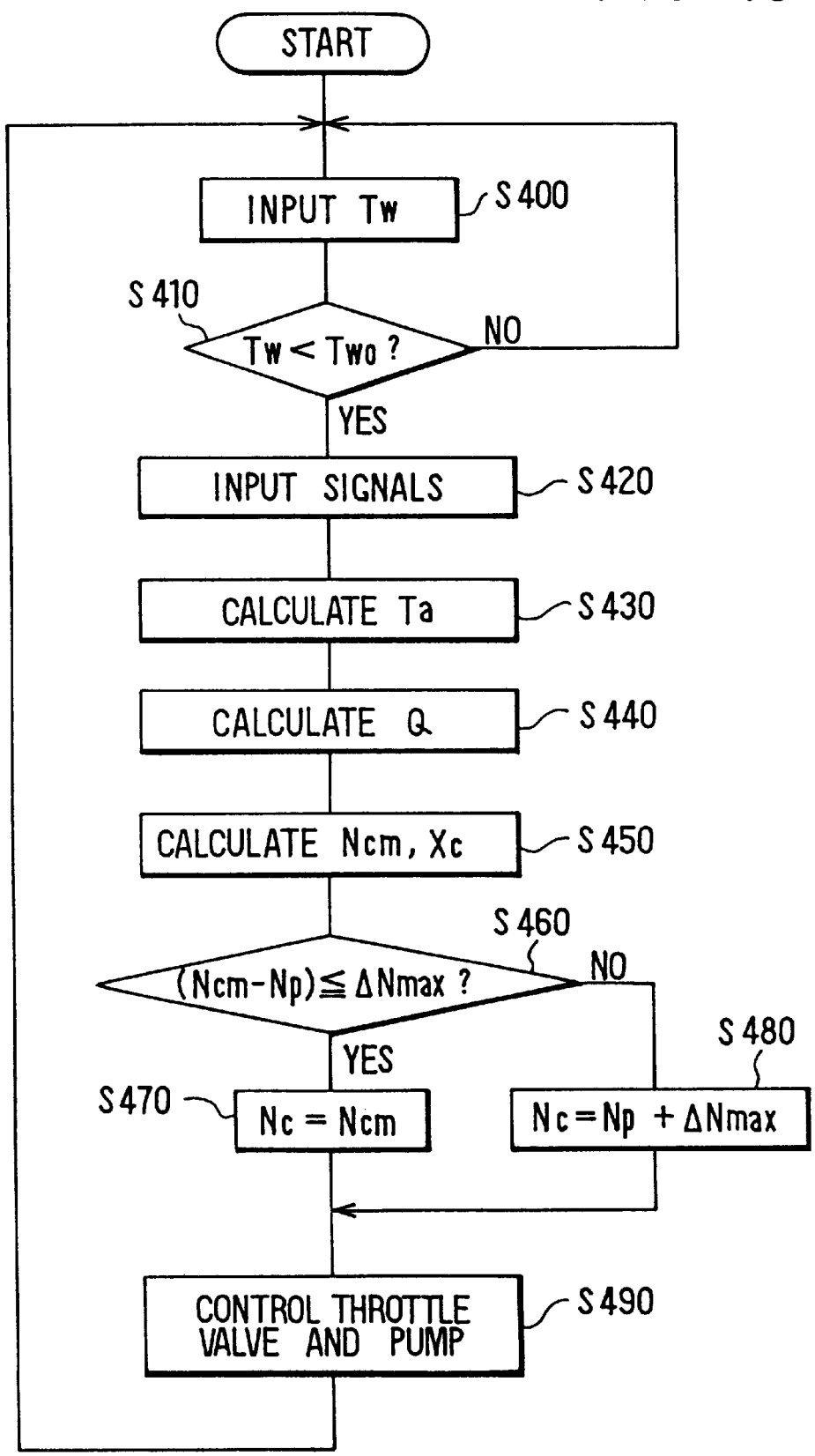
FIG. 13 is a flow diagram showing a control process of the heating apparatus according to the third embodiment.
Figure 14:
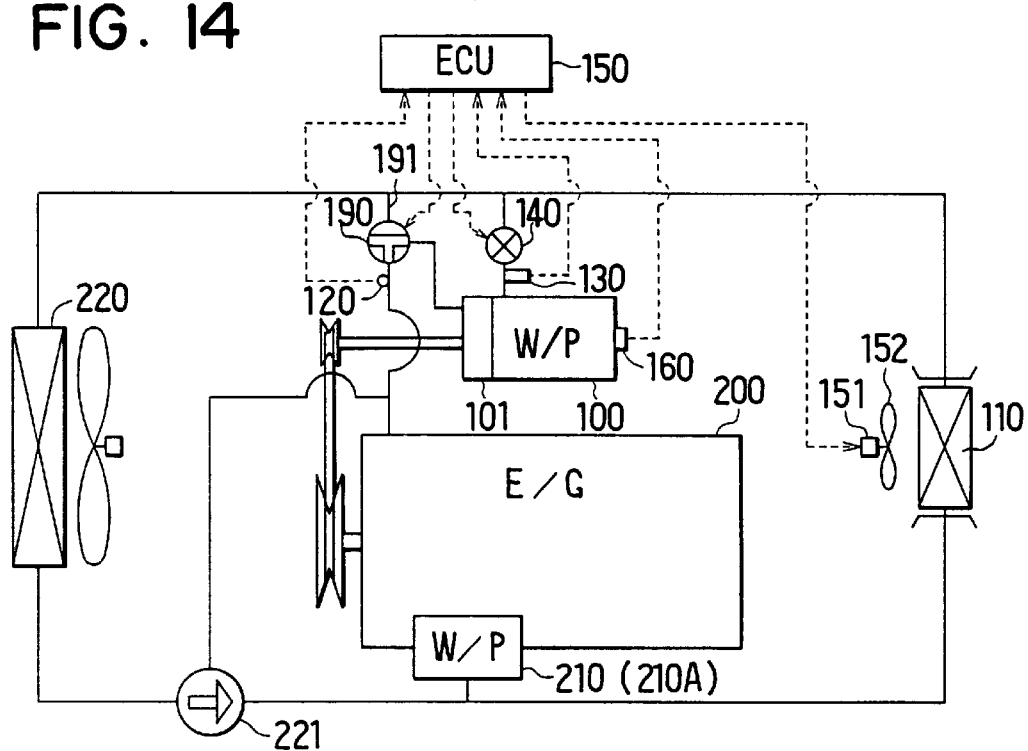
FIG. 14 is a schematic diagram showing a heating apparatus for a vehicle according to a fourth preferred embodiment of the present invention.

As shown in FIG. 12, in the third embodiment, a centrifugal pump 210A is driven by an electrical motor 170 which is rotated and controlled by an inverter 171, and a water jacket 172 is provided around the electrical motor 170 so that heat generated from the electrical motor 170 is transmitted to the cooling water in the cooling water circuit. Therefore, in the third embodiment, heat generated from throttle valve 140, the pump 210A, and the electrical motor 170 is transmitted to the cooling water in the cooling water circuit, thereby increasing heating capacity of the heating apparatus.

Next, operation of the heating apparatus according to the third embodiment of the present invention will be now described with reference to FIG. 13. When the heating switch is turned on after operation of the engine 200 starts, the water temperature Tw detected by the temperature sensor 120 is input at step S400. At step S410, it is determined whether or not the water temperature Tw is lower than a predetermined temperature Two. When the water temperature Tw is equal to or is higher than the predetermined temperature, the program returns to Step S400. On the other hand, when the water temperature, Tw is lower than the predetermined temperature Two, signals from the air-blowing amount V of the blower 152 and the rotation speed Np of the centrifugal pump 210A are input at step S420. At step S430, the temperature Ta of air immediately after passed through the heater core 110 is calculated similarly to the first embodiment. Next, the necessary heating quantity Q for heating the passenger compartment is calculated based on the difference between the calculated temperature Ta and a pre-set target temperature Tao (e.g., 50° C.) similarly to the second embodiment, at step S440. Further, at step S450, a temporary target rotation speed Ncm of the centrifugal pump 210A and a target opening degree Xc of the throttle valve 140 are calculated according to the necessary heating quantity Q based on the graphs shown in FIGS. 9, 10.

At step S450, it is determined whether or nor a rotation speed difference ΔN between the temporary target rotation speed Ncm and the rotation speed Np detected by the rotation speed sensor 160 is equal to or lower than a predetermined rotation speed difference $\Delta N_{max}$. When the difference ΔN is equal to or lower than the predetermined difference $\Delta N_{max}$, the target rotation speed Nc is set to the temporary target rotation speed Ncm at step S470. On the other hand, when the difference ΔN is larger than the predetermined difference $\Delta N_{max}$, the target rotation speed Nc is set to (Np+$\Delta N_{max}$), at step S480. Thereafter, the driving motor 141 is controlled so that the opening degree of the throttle valve 140 is set to the target opening degree Xc, and the electrical motor 170 is controlled so that the rotation speed of the centrifugal pump 210A is set to the target rotation speed Nc, at step S480.

A fourth preferred embodiment of the present invention will be now described with reference to FIGS. 14–18. In the fourth embodiment, components similar to those in the first embodiment are indicated to the same numbers.

In the fourth embodiment, the water pump 210 (210A) for circulating cooling water for cooling the engine 200 is similar to that in the first embodiment, and is driven by the engine 200. Hereinafter, the water pump 210 (210A) is indicated as first pump 210. In the fourth embodiment, the first pump 210 may be a volume type or a centrifugal type.

In the fourth embodiment, a second pump (i.e., supplementary pump) 100 is a regenerative pump (i.e., Wesco pump), and is driven by the engine 200 through an electromagnetic clutch (i.e., power transmission unit) 101. The electromagnetic clutch 101 intermittently transmits the driving force of the engine 200 to the second pump 100. Similarly to the above-described first embodiment, cooling water flowing into the radiator 220 is heat-exchanged with outside air to be cooled by the outside air (i.e., air outside the passenger compartment). Further, according to the temperature of cooling water, the amount of cooling water flowing into the radiator 220 is adjusted by the thermostat 221. The heater core 110 heats air to be blown into the passenger compartment using cooling water as a heating source. The temperature of cooling water flowing from the engine 200 is detected by the temperature sensor 120, and the pressure of cooling water discharged from the second pump 100 is detected by the pressure sensor 130. In the fourth embodiment, the throttle valve 140 is disposed in a water passage from the pressure sensor 130 to the heater core 110 to control the opening degree of the water passage in the cooling water circuit.

A switching valve 190 is disposed in a bypass passage 191 of the cooling water circuit to switch a first communication where cooling water from the engine 200 flows into a suction side of the second pump 100, and a second communication where cooling water from the engine 200 flows into suction sides of the radiator 220 and the heater core 110 while bypassing the second pump 100 and the throttle valve 140. That is, through the bypass passage 191, cooling water from the engine 200 bypasses the second pump 100 and the throttle valve 140. Both of the switching valve 190 and the electromagnetic clutch 101 are controlled by the ECU 150.

In the fourth embodiment, the control of the throttle valve 140 and the calculation of the target pressure of cooling water discharged from the second pump 100 are similar to those in the first embodiment, and the explanation thereof is omitted.

Next, operation of the heating apparatus according to the fourth embodiment of the present invention will be now described. Here, operations of the switching valve 190 and the electromagnetic clutch 101 are mainly described.

(1) FIRST MODE

Figure 15:
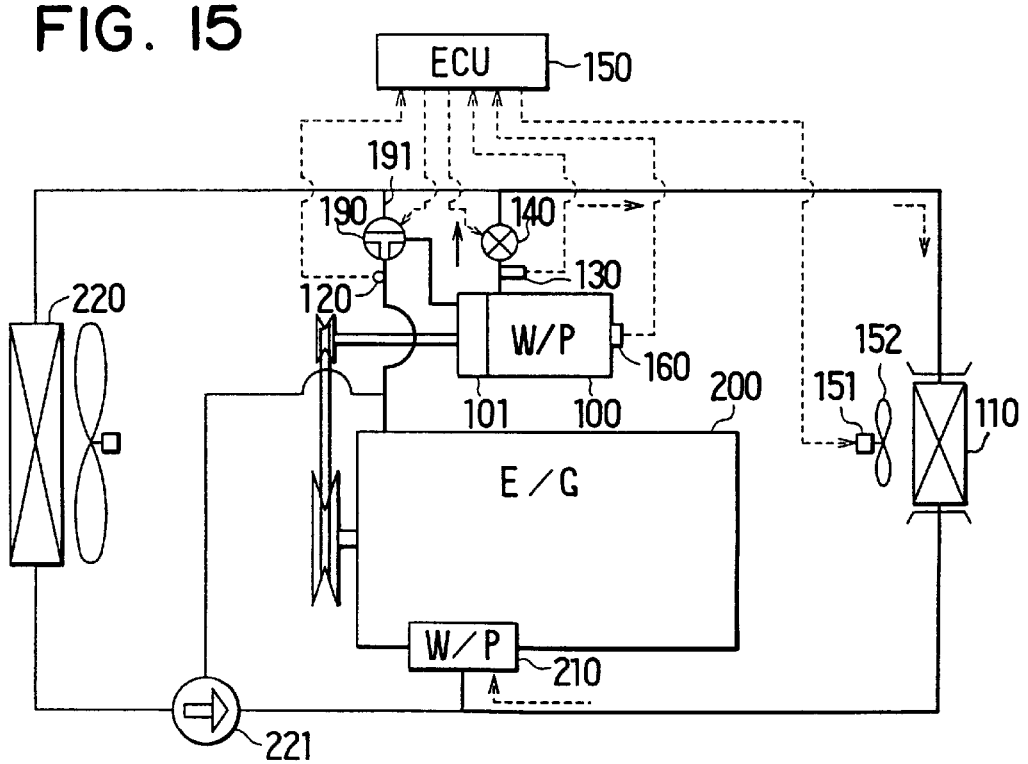
FIG. 15 is a schematic diagram showing a flow of cooling water in a cooling water circuit of the heating apparatus during a first mode, according to the fourth embodiment.

The first mode shown in FIG. 15 is set, when the rotation speed of the engine 200 is lower than a predetermined speed (e.g., idling rotation speed, in the fourth embodiment) during a heating operation. For example, the heating operation is performed when the temperature of outside air is low in the winter, or when the heating switch is turned on. During the first mode, the electromagnetic clutch 101 is turned on so that the driving force of the engine 200 is transmitted to the second pump 100, and throttle control of the throttle valve 140 is performed. Further, the switching valve 190 is operated to a first position shown in FIG. 15 so that cooling water flowing from the engine 200 flows into the suction side of the second pump 100. That is, when the switching valve 190 is operated to the first position, the bypass passage 191 is closed and cooling water flows into the second pump 100.

In the first mode, because the temperature of outside air is low, the thermostat 221 is closed so that cooling water from the engine 200 mainly flows into the heater core 110 while bypassing the radiator 220.

(2) SECOND MODE

Figure 16:
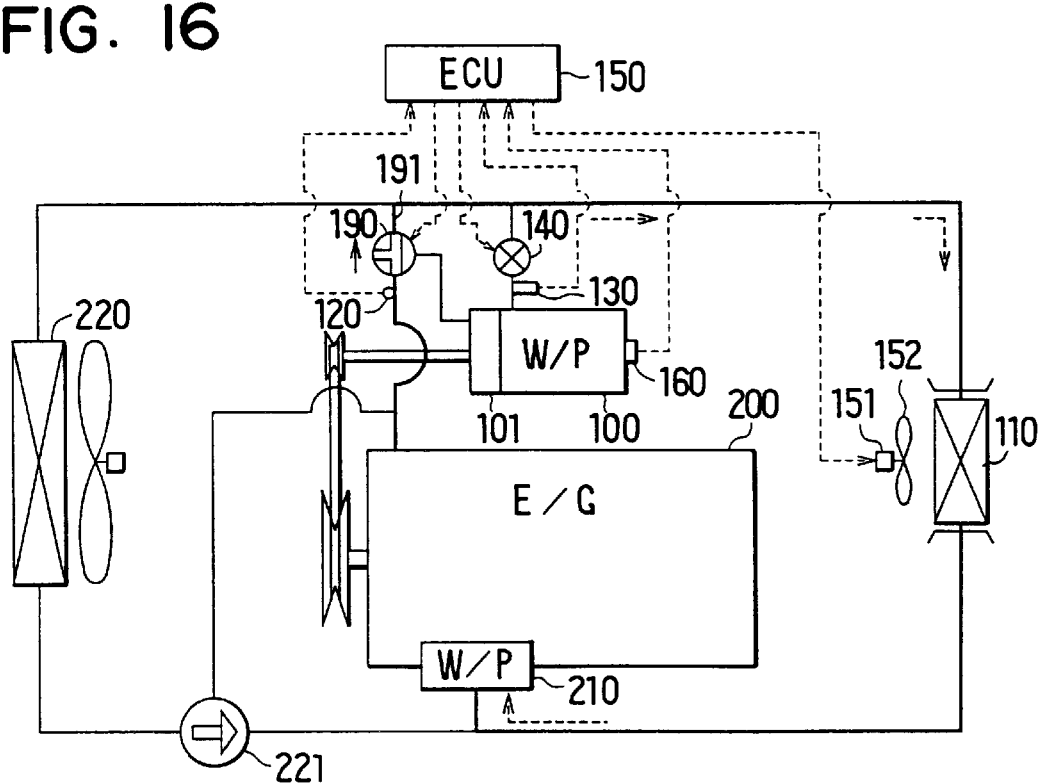
FIG. 16 is a schematic diagram showing a flow of cooling water in the cooling water circuit during a second mode, according to the fourth embodiment.

The second mode shown in FIG. 16 is set, when the rotation speed of the engine 200 is higher than a predetermined speed (e.g., rotation speed during vehicle travelling, in the fourth embodiment) during the heating operation. During the second mode, a sufficient amount of cooling water can be proposed by only the first pump 210, and the temperature of cooling water is increased to sufficiently heat the passenger compartment. Thus, during the second mode, the electromagnetic clutch 101 is turned off so that the second pump 100 is stopped, and the throttle valve 140 is fully opened so that the throttle control of the throttle valve 140 is stopped. Further, the switching valve 190 is operated to a second position to open the bypass passage 191 so that cooling water flowing from the engine 200 bypasses the second pump 100 and the throttle valve 140.

In the second mode, similarly to the first mode, cooling water flowing from the engine 200 mainly flows into the heater core 110 while bypassing the radiator 220.

(3) THIRD MODE

Figure 17:
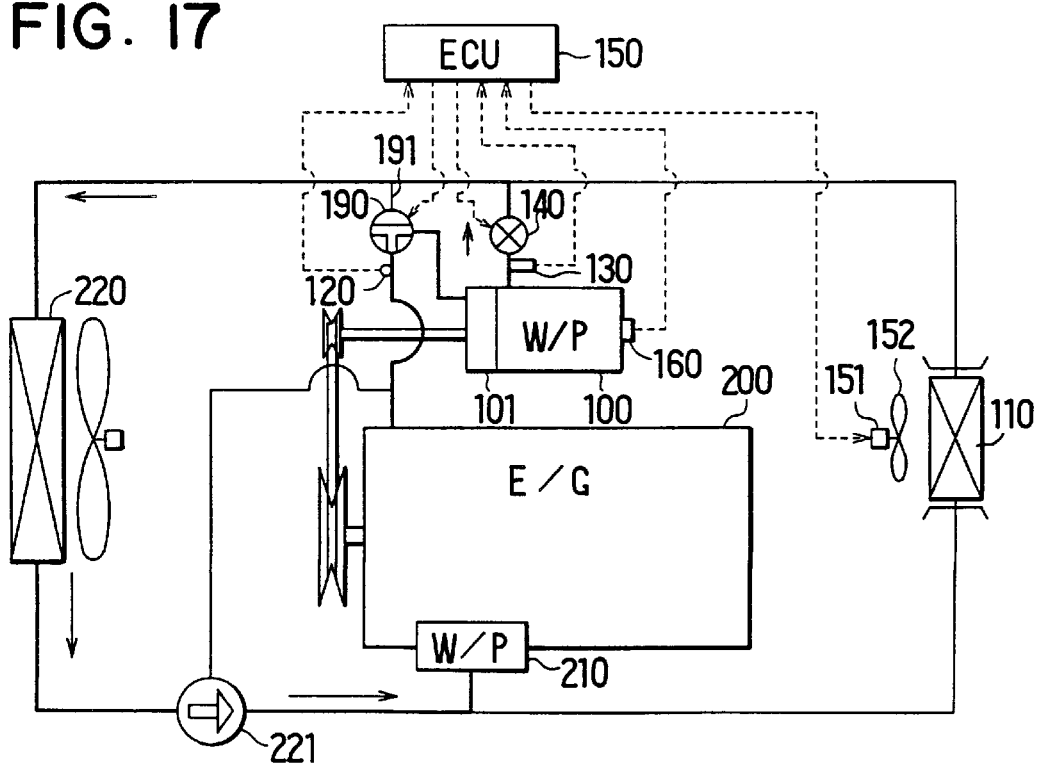
FIG. 17 is a schematic diagram showing a flow of cooling water in the cooling water circuit during a third mode, according to the fourth embodiment.

The third mode shown in FIG. 17 is set, when the rotation speed of the engine 200 is lower than a predetermined speed when the heating operation is not performed. For example, the heating operation is not performed when the temperature of outside air is high in the summer, or when the heating switch is turned off. During the third mode, the electromagnetic clutch 101 is turned on so that the second pump 100 is operated, and the throttle valve 140 is fully opened. Further, the switching valve 190 is operated to the first position to close the bypass passage 191, so that cooling water flowing from the engine 200 flows into the second pump 100.

On the other hand, during the third mode, because the temperature of the outside air is high, the thermostat 221 is opened, and a water valve (not shown) provided in a water passage at a side of the heater core 110 is closed. Therefore, cooling water flowing from the engine 200 mainly flows into the radiator 220 while bypassing the heater core 110.

(4) FOURTH MODE

Figure 18:
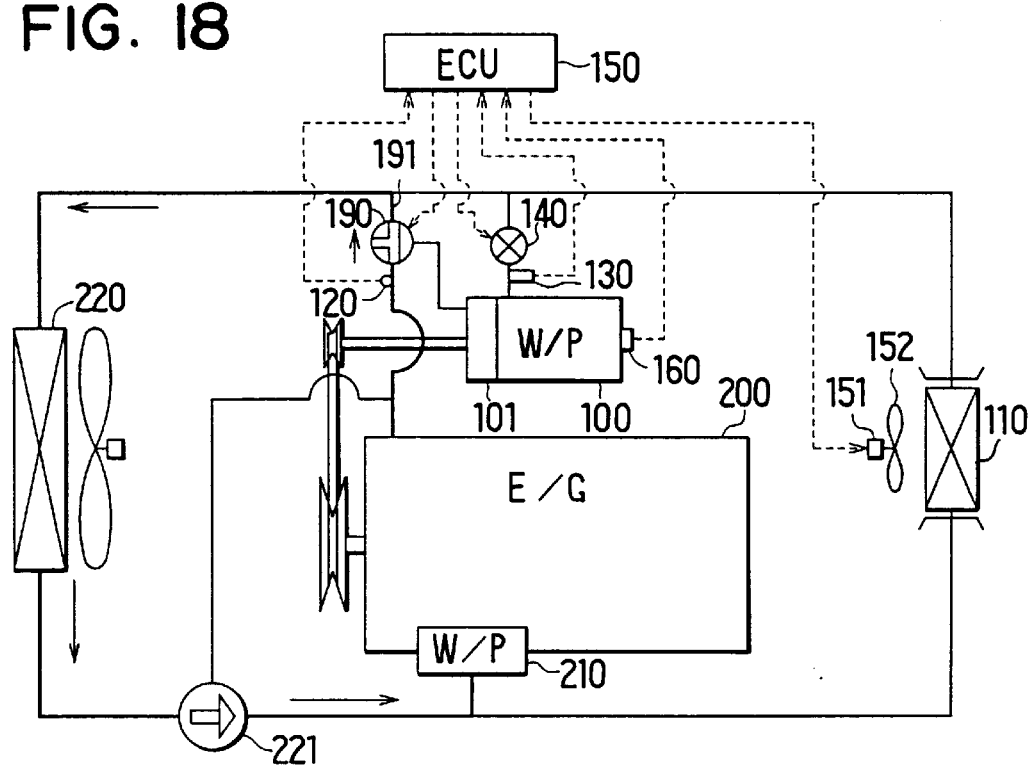
FIG. 18 is a schematic diagram showing a flow of cooling water in the cooling water circuit during a fourth mode, according to the fourth embodiment.

The fourth mode shown in FIG. 18 is performed, when the rotation speed of the engine 200 is higher than a predetermined speed (e.g., rotation speed during a vehicle traveling, in the fourth embodiment) when the heating operation is not performed. For example, when the temperature of outside air is high in the summer, or when the heating switch is turned off, the heating operation is not performed. During the fourth mode, a sufficient flow amount of water can be obtained only by the first pump 210. Therefore, the electromagnetic clutch 101 is turned off so that the second pump 100 is stopped, and the throttle valve 140 is fully opened so that the throttle control of the throttle valve 140 is not performed. Further, the switching valve 190 is operated to the second position to open the bypass passage 191, so that cooling water flowing from the engine 200 flows through the bypass passage 191 while bypassing the second pump 100 and the throttle valve 140. In the fourth mode, similarly to the third mode, cooling water flowing from the engine 200 mainly flows into the radiator 220 while bypassing the heater core 110.

According to the fourth embodiment of the present invention, the second pump 100 prevents a flow amount shortage in the cooling water circuit. Therefore, even when the throttle valve 140 reduces an opening area of the cooling water passage, the flow amount of cooling water is not greatly decreased, and heating capacity of the heating apparatus can be improved.

As described above, in a centrifugal pump or a regenerative pump, it is necessary to change the pump rotation speed or the discharge pressure of water in the pump according to pump load (pressure loss $\Delta P$) so that the discharge flow amount of water is maintained at a predetermined amount. In this case, when the opening degree of the throttle valve 140 is made smaller to increase heating quantity in the throttle valve 140, the pump load also becomes larger. Therefore, unless the rotation speed of the engine 200 is increased, the flow amount of cooling water circulating in the cooling water circuit is decreased.

According to the fourth embodiment of the present invention, the discharge pressure of cooling water is increased by the second pump 100. Therefore, it can prevent heating source shortage, and a sufficient water amount circulating in the cooling water circuit can be obtained.

Further, in the fourth embodiment, the water amount equal to or more than 25 L/min can be supplied into the radiator 220 when the temperature of outside air is high in the summer. In a general district where the temperature of outside air is not excessively low in the winter or in a rear heater vehicle, the water amount equal to or more than 10 L/min can be supplied into the heater core 110. In a cold district where the temperature of outside air is excessively low in the winter, the water amount equal to or more than 5–8 L/min can be supplied into the heater core 110. In the cold district in the winter, the opening degree of the throttle valve 140 is decreased so that the heat-generating amount in the throttle valve 140 is increased.

According to the fourth embodiment of the present invention, the second pump 100 is used as a supplementary heating source during the heating operation, so that heating capacity of the heating apparatus is improved. on the other hand, during the non-heating operation, the second pump 100 is used as a supplementary pump of the first pump 210, so that the amount of cooling water circulating in the cooling water circuit can be increased. Thus, the second pump 100 can be effectively used in the all seasons without increasing the water flow resistance in the water passage of the cooling water circuit.

As described above, the heating apparatus according to the fourth embodiment can prevent the shortage of the heating capacity while preventing the flow amount of cooling water flowing into the heater core 110 or the radiator 220 from being reduced. Further, when the flow amount of the cooling water is sufficient and the temperature of cooling water is high when the rotation speed of the engine 200 is high, the operation of the second pump 100 is stopped; and therefore, unnecessary load is not applied to the engine 200.

A fifth preferred embodiment of the present invention will be now described with reference to FIG. 19.

Figure 19:
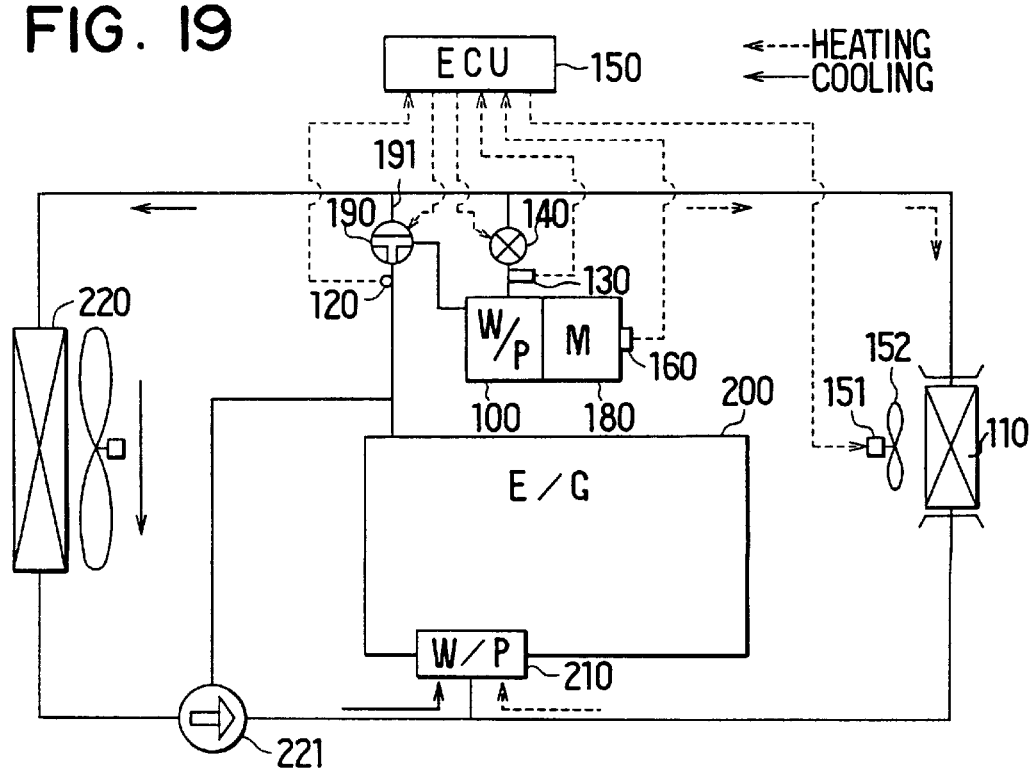
FIG. 19 is a schematic diagram showing a heating apparatus for a vehicle according to a fifth preferred embodiment of the present invention.

In the fifth embodiment, as shown in FIG. 19, the electromagnetic clutch 101 described in the fourth embodiment is omitted, and the second pump 100 is driven by an electrical motor 180. In the fifth embodiment, when the engine 200 operates, the on-off control of the electrical motor 180 is performed similarly to the on-off control of the electromagnetic clutch 101. Thus, even when the engine 200 is stopped when the temperature of cooling water is high, it can prevent the temperature of cooling water from being excessively increased. On the other hand, even when the engine 200 is stopped, the heating operation can be continued.

According to the fifth embodiment of the present invention, the second pump 100 is operated by the electrical motor 180. Therefore, the pump output power Wp (heat-generating amount) can be controlled by controlling both of the throttle valve 140 and the rotation speed of the second pump 100, or by only controlling the rotation speed of the second pump 100. In the fifth embodiment, the other portions are similar to those of the fourth embodiment, and the explanation thereof is omitted.

A sixth preferred embodiment of the present invention will be now described with reference to FIG. 20. In the sixth embodiment, the heating apparatus of the above-described fourth embodiment is controlled in accordance with the flow diagram shown in FIG. 20.

Figure 20:
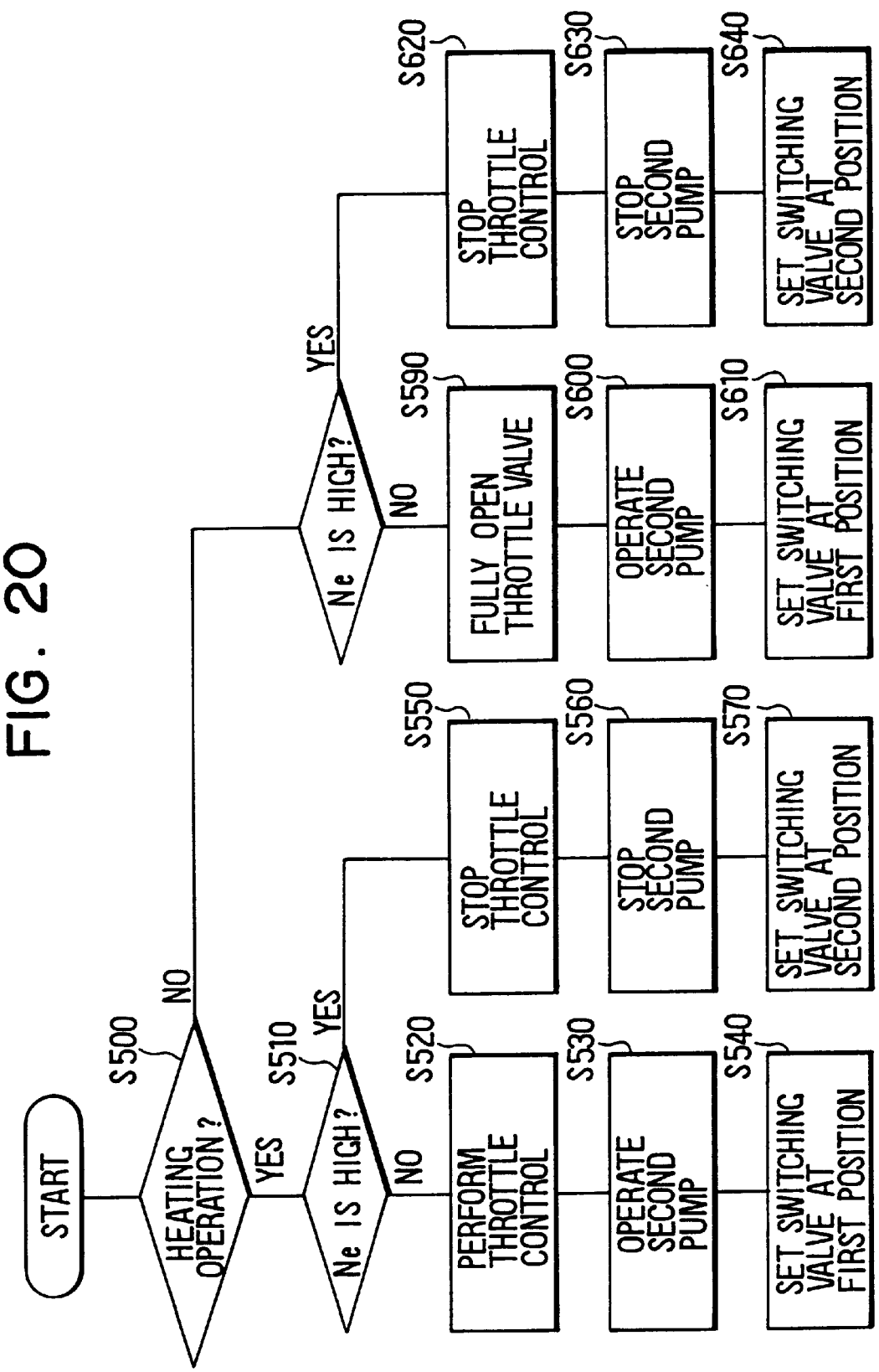
FIG. 20 is a flow diagram of a control process of a heating apparatus according to a sixth preferred embodiment of the present invention.

As shown in FIG. 20, firstly, at step S500, it is determined whether or not the heating operation of the heating apparatus is set according to the water temperature Tw or the on-off state of the heating switch. When the heating operation is set, it is determined whether or not the rotation speed Ne of the engine 200 is higher than a predetermined rotation speed (e.g., idling rotation speed), at step S510.

When it is determined that the rotation speed Ne of the engine 200 is lower than the predetermined rotation speed at step S510, the throttle control of the throttle valve 140 is performed at step S520. That is, at step S520, the opening degree of the throttle valve 140 is controlled. Further, the second pump 100 is operated at step S530, and the switching valve 190 is operated to the first position to close the bypass passage 191 at step S540, similarly to the first mode in FIG. 15.

On the other hand, when it is determined that the rotation speed Ne of the engine 200 is higher than the predetermined rotation speed at step S510, the throttle valve 140 is fully opened at step S550 so that the throttle control of the throttle valve 140 is stopped. Further, the second pump 100 is stopped at step S560, and the switching valve 190 is operated to the second position at step S570 to open the bypass passage 191, similarly to the second mode in FIG. 16.

When the heating operation is not determined, i.e., when the non-heating operation is determined at step S500, it is determined whether or not the rotation speed Ne of the engine 200 is higher than a predetermined rotation speed (e.g., idling rotation speed), at step S580. When it is determined that the rotation speed Ne of the engine 200 is lower that the predetermined rotation speed at step S580, the throttle valve 140 is fully opened at step S590. Further, the second pump 100 is operated at step S600, and the switching valve 190 is operated to the first position to close the bypass passage at step S610, similarly to the third mode in FIG. 17.

On the other hand, when it is determined that the rotation speed Ne of the engine 200 is higher than the predetermined rotation speed at step S580, the throttle valve 140 is fully opened at step S620 so that the throttle control of the throttle valve 140 is stopped. Further, the second pump 100 is stopped at step S630, and the switching valve 190 is operated to the second position at step S640, similarly to the fourth mode in FIG. 18.

Figure 21:
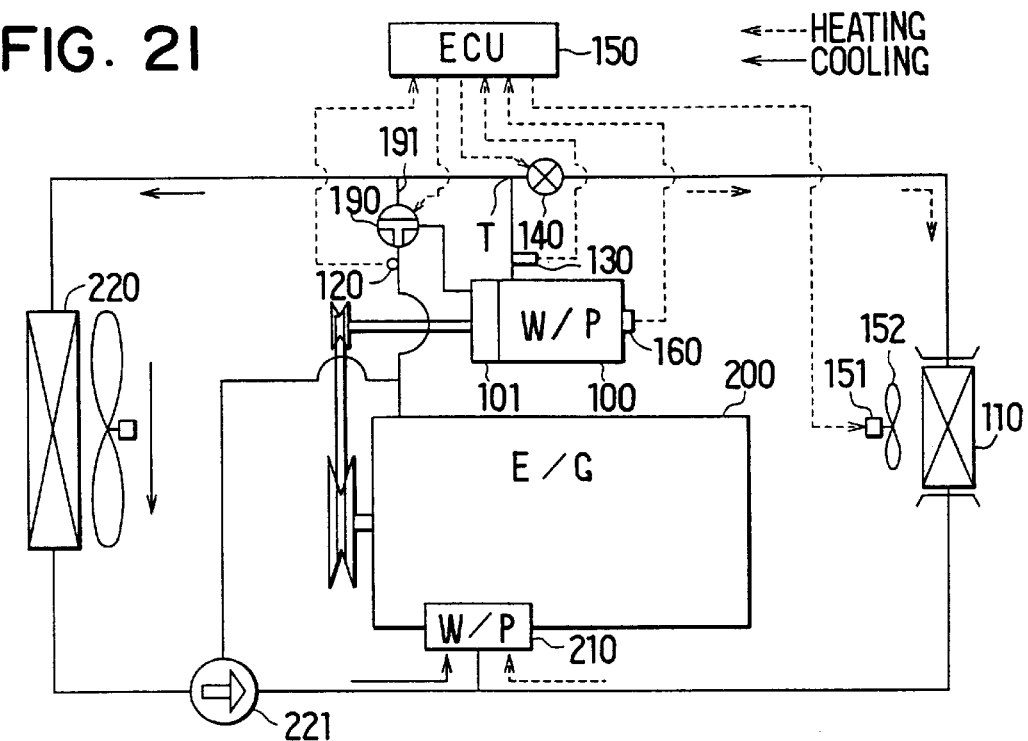
FIG. 21 is a schematic diagram showing a heating apparatus for a vehicle according to a seventh preferred embodiment of the present invention.

A seventh preferred embodiment of the present invention will be now described with reference to FIG. 21. In the above-described fourth through sixth embodiments, the throttle valve 140 is disposed in a water passage between the second pump 100 and a branch point T where cooling water flowing from the second pump 100 is branched into a first flow toward the heater core 110 and a second flow toward the radiator 220. However, as shown in FIG. 21, in the seventh embodiment of the present invention, the throttle valve 140 is disposed in a water passage between the branch point T and the heater core 110.

An eighth preferred embodiment of the present invention will be now described with reference to FIG. 22. In the eighth embodiment, a regeneration pump (i.e., peripheral pump) is used as the first pump 210 or the second pump 100. Here, a regeneration pump 300 is typically used as the first pump 210.

Figure 22:
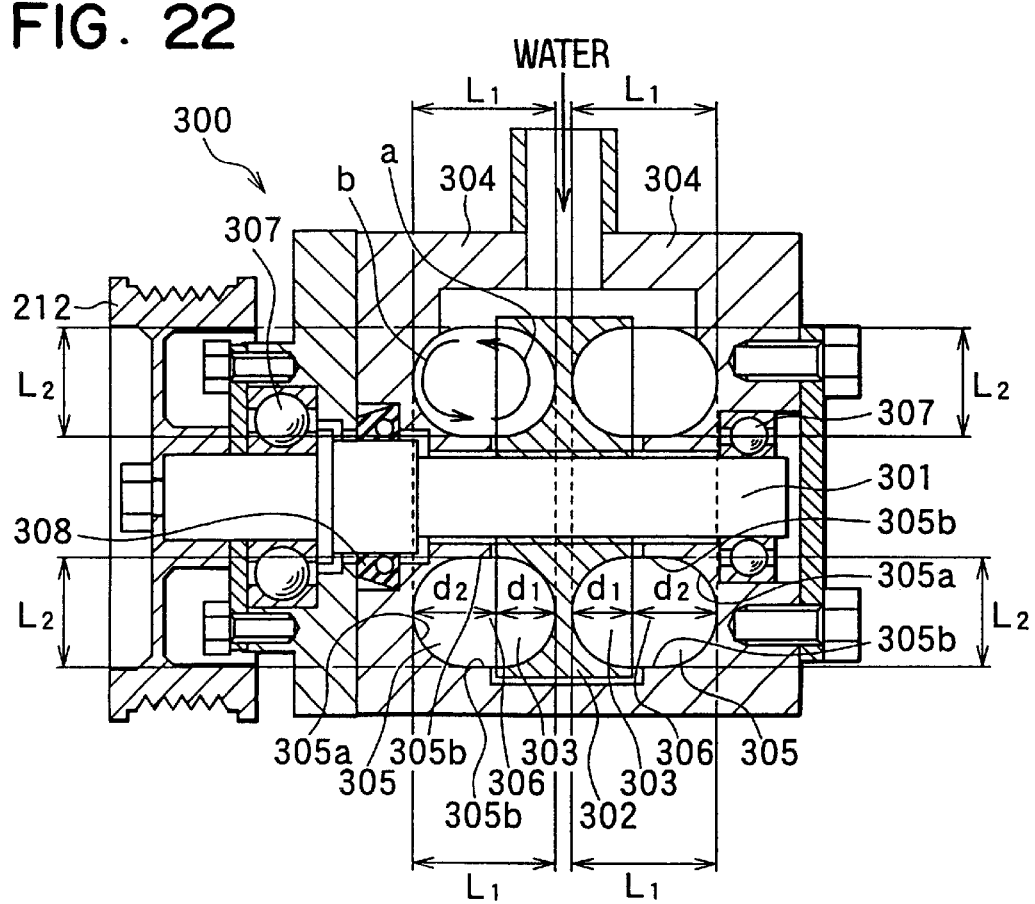
FIG. 22 is a cross-sectional view showing a regenerative pump for a heating apparatus according to an eighth preferred embodiment of the present invention.

As shown in FIG. 22, a shaft 301 is rotated by the driving force of the engine 200. A circular impeller 302 is rotated integrally with the shaft 301, and has plural recess portions 303 each of which is recessed in a longitudinal direction of the shaft 301 to approximately have a semi-spherical shape (bowl like). In the regenerative pump 300 of the eighth embodiment, recess portions 303 are formed on both board surfaces of the impeller 302.

The impeller 302 is accommodated in a pump housing 304. Ring-like fluid passages 305 recessed in the longitudinal direction of the shaft 301 are formed in the pump housing 304 at positions opposite to the recess portions 303 around the shaft 301. Each of the fluid passage 305 has a semi-oval shape composed of an arc portion 305a and two straight portions 305b. Therefore, spaces 306 are formed by the fluid passages 305 and the recess portions 303. Each of the spaces 306 is formed into an oval shape to have a dimension L1 at a position parallel to the shaft 301, and a dimension L2 at a position perpendicular to the shaft 301. Here, the dimension L1 is larger than the dimension L2.

The shaft 301 is rotatably held by a bearing 307, and a seal member 308 is attached to prevent cooling water from being lacked from a clearance between the shaft 301 and the pump housing 304.

Next, operation of the regenerative pump 300 according to the eighth embodiment of the present invention will be now described. When the impeller 302 of the regenerative pump 300 rotates, cooling water in the recess portions 303 flows from a radius inner side to a radius outside side of the impeller 302 along an arc-like bottom of the recess portion 303 by centrifugal force, as shown by arrow "a" in FIG. 22. Thereafter, cooling water reached to the outer side of the impeller 302 along the bottom of the recess portion 303 flows into the fluid passages 305 by dynamic pressure, and flows from a radius outside to a radius inner side of the fluid passages 305 along an inner wall of the pump housing 304 as shown by arrow "b" in FIG. 22, thereafter flows again into the recess portions 303. That is, cooling water rotates along the inner wall defining the spaces 306 by centrifugal force applied from the impeller 302. In addition to the centrifugal force, rotation force of the impeller 302 is also applied to cooling water. Thus, by repeating the rotation of cooling water along the inner wall defining the space 306, hydrostatic pressure of cooling water is increased, and a rotation direction of cooling water is changed into the rotation direction of the impeller 302. Thereafter, cooling water is finally discharged from a discharge port (not shown) of the regenerative pump 300 to the outside.

In the eighth embodiment of the present invention, a recessed dimension d2 of each fluid passage 305 is made larger than a recessed dimension d1 of the recess portion 303 of the impeller 302, so that each sectional area of the space 306 is increased. Further, each of the spaces 306 is formed into an oval shape so that the dimension L1 becomes larger than the dimension L2. Therefore, the sectional area of each space 306 can be increased, while the dimension of the regenerative pump 300 in a radius direction perpendicular to the longitudinal direction of the shaft 301 is reduced. Thus, fluid amount discharged from the regenerative pump 300 can be increased without an increase of the radius dimension of the regenerative pump 300.

Figure 23:
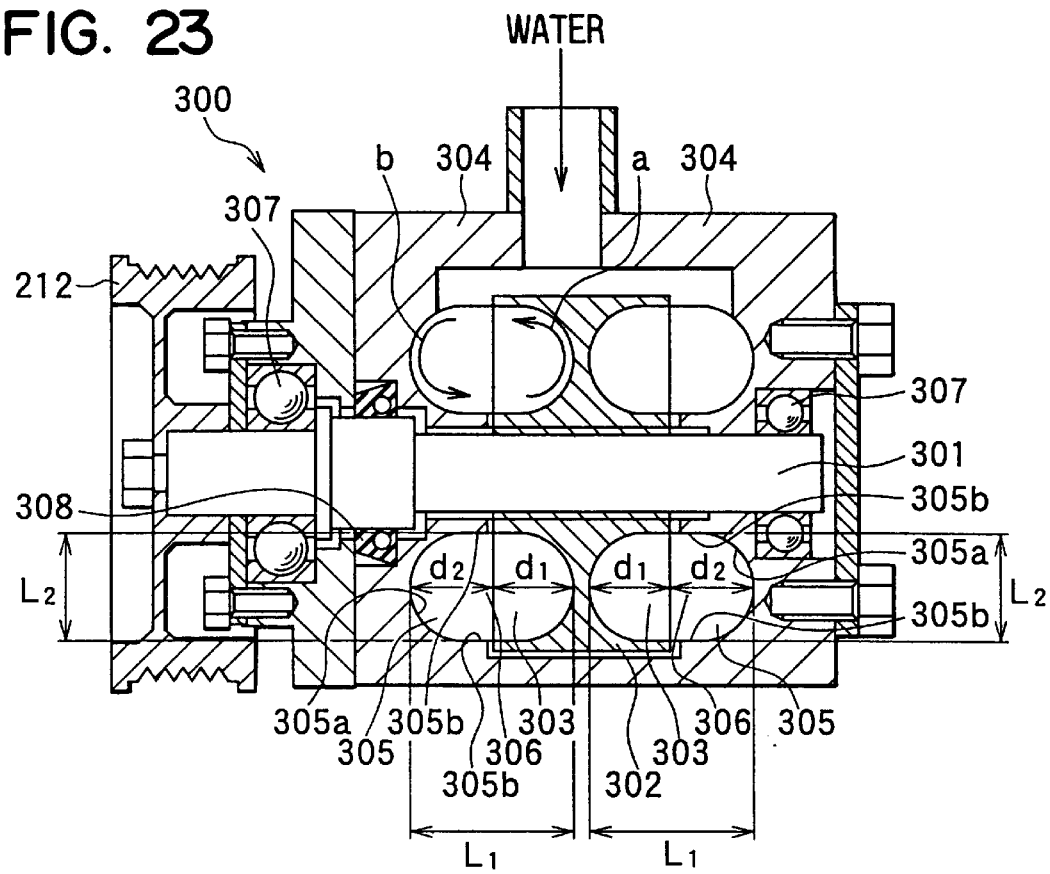
FIG. 23 is a cross-sectional view showing a regenerative pump for a heating apparatus according to a ninth preferred embodiment of the present invention.

A ninth preferred embodiment of the present invention will be now described with reference to FIG. 23.

In the above-described eighth embodiment, the recessed dimension d2 of each fluid passage 305 is made larger than the recessed dimension d1 of each recess portion 303 of the impeller 302 so that each sectional area of the spaces 306 is increased. However, in the ninth embodiment, as shown in FIG. 23, each recess portion 303 of the impeller 302 is enlarged from a semi-spherical shape to a semi-oval shape, so that the recessed dimension dl of each recess portion 303 of the impeller 302 is made larger than the recessed dimension d2 of each fluid passage 305.

Figure 24:
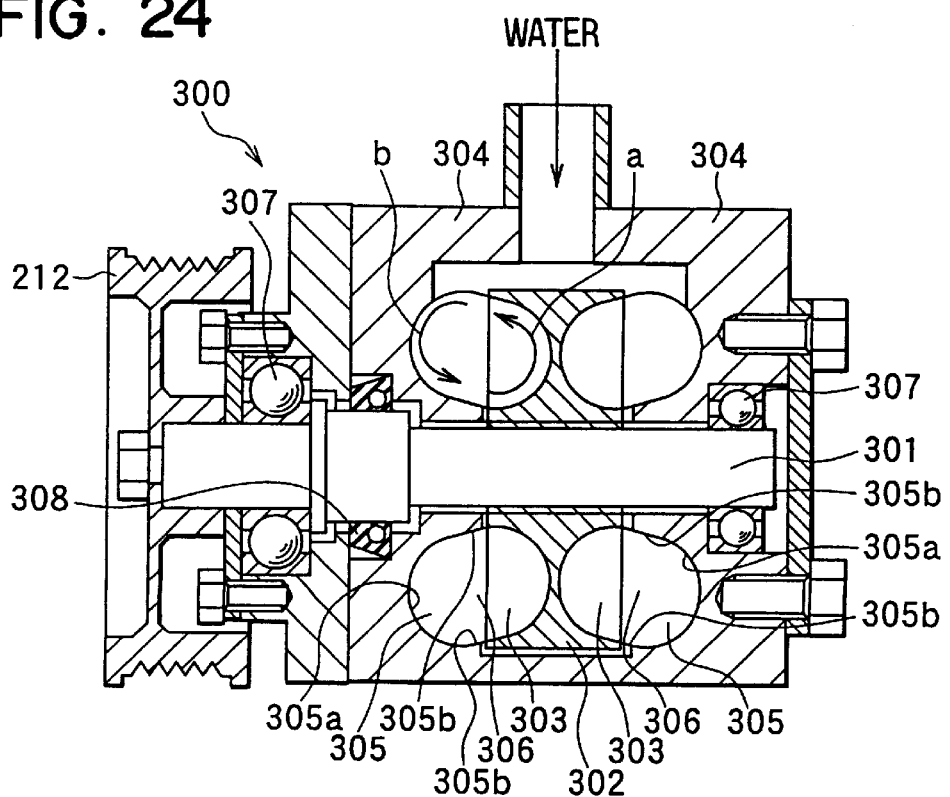
FIG. 24 is a cross-sectional view showing a regenerative pump for a heating apparatus according to a tenth preferred embodiment of the present invention.
Figure 25:
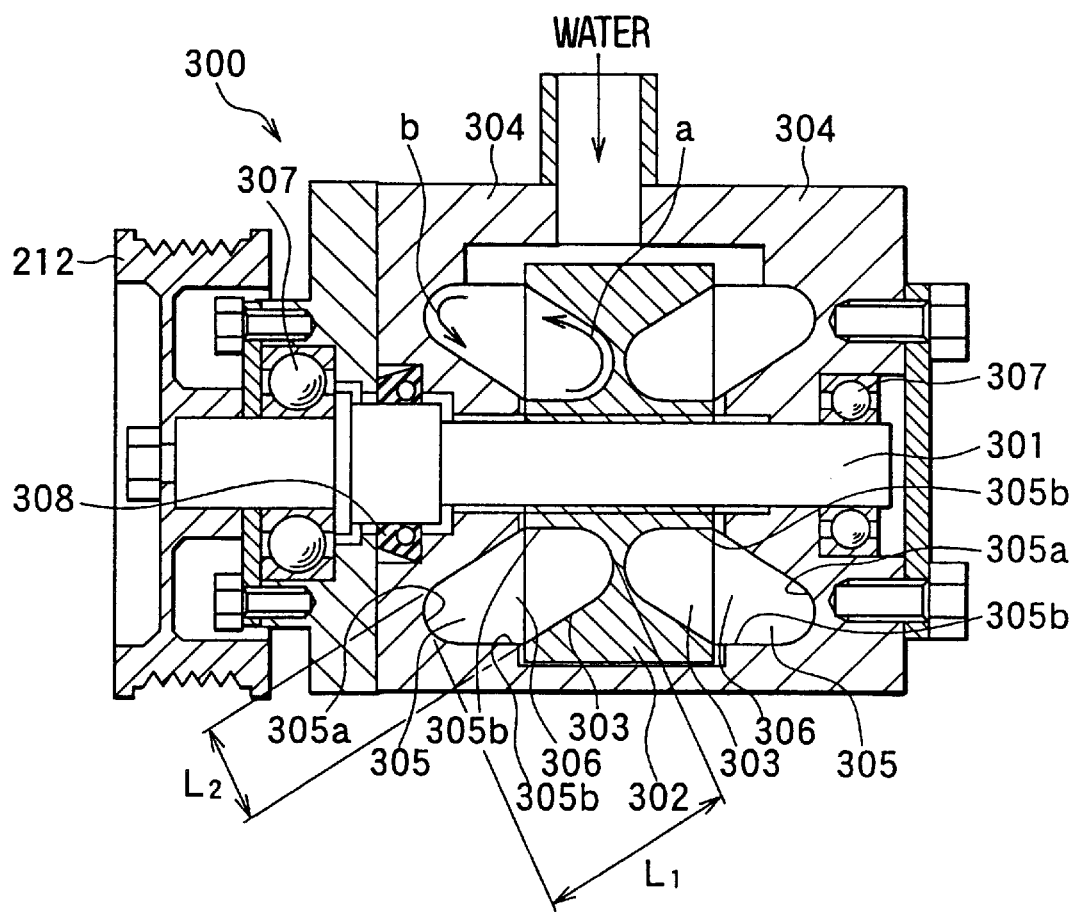
FIG. 25 is a cross-sectional view showing a regenerative pump for a heating apparatus according to the tenth embodiment.

A tenth preferred embodiment of the present invention will be now described with reference to FIGS. 24 and 25.

In the above-described eighth and ninth embodiments, the longer-diameter direction of each sectional area of the spaces 306 is formed to be parallel to the longitudinal direction of the shaft 301. However, as shown in FIGS. 24, 25, the spaces 306 are formed so that the longer-diameter dimension of each sectional area of the spaces 306 is crossed with the longitudinal direction of the shaft 301. In FIG. 24, the diameter of each arc portion of the recess portions 303, the opening diameter of each recess portion 303, the diameter of each arc portion of the fluid passages 305 and the opening width of each fluid passage 305 are set to be equal to each other. On the other hand, in FIG. 25, the diameter of each arc portion of the recess portions 303 is set to be different from the opening diameter of each recess portion 303, and the diameter of each arc portion of the fluid passages 305 is formed to be different from the opening width of each fluid passage 305.

Although the present invention has been fully described in connection with preferred embodiments thereof with reference to the accompanying drawings, it is to be noted that various changes and modifications will become apparent to those skilled in the art.

For example, in the above-described embodiments, the opening degree of the throttle valve 140 is continually variably controlled. However, the opening degree of the throttle valve 140 may be controlled in two steps or in multiple steps. Further, in the above-described embodiments, only when the temperature of cooling water is quickly increased during an engine warming-up operation, the opening degree of the throttle valve 140 may be reduced.

In the above-described third embodiment, the water temperature Tw is controlled by controlling the opening degree of the throttle valve 140 (discharge pressure of the pump 210), and the flow amount of cooling water circulating in the cooling water circuit is controlled by controlling the rotation speed Np of the pump 210, so that heating quantity determined by the water temperature Tw and the flow amount is set to the necessary heating quantity Q. However, the heating capacity of the heating apparatus is determined by at least one of the water temperature Tw (blown-air temperature Ta) and the heating quantity or both thereof. Therefore, in the third embodiment of the present invention, the water temperature Tw (Ta) may be controlled only by the opening degree of the throttle valve 140, and the flow amount of cooling water circulating in the cooling water circuit may be controlled only by a rotation speed Np of the pump 210. The pressure loss ΔP is approximately proportional to the square of the flow amount of cooling water. Therefore, even when the opening degree of the throttle valve 140 is maintained at a constant value, the pressure loss ΔP is changed as the flow amount of cooling water changes. Thus, the pump output power Wp can be controlled only by controlling the flow amount of cooling water.

Further, in the above-described first through third embodiments, the pump 210 is not limited to the vane type pump or the centrifugal type pump. The pump 210 may be the other type pump such as a piston type pump, a swash plate type pump, a Rooth type pump, a screw type pump and a regenerative type pump. Further, the driving source of the pump 210 is not limited to the engine 200 or the electrical motor 170. That is, the pump 210 may be driven by the other driving source such as compressed air stored during a vehicle-travelling, sucked negative pressure of the engine 200 and discharging pressure of the engine 200.

In the above-described fourth embodiment, the electromagnetic clutch 101 may be omitted, and a bypass passage through which cooling water is introduced into the throttle valve 140 while bypassing the second pump 100 may be provided. In this case, even when the electromagnet clutch 101 is omitted, the second pump 100 can be substantially stopped during the second mode or the fourth mode.

In the above-described fifth embodiment, there may be provided a bypass passage through which cooling water is introduced into the engine 200 while bypassing the first pump 210.

In the above-described fourth through seventh embodiments, the switching valve 190 may be omitted so that cooling water from the engine 200 always flows into both of the second pump 100 and the bypass passage 191. In the above-described fifth embodiment, the rotation speed of the electrical pump 180 may be continually variably controlled.

Such changes and modifications are to be understood as being within the scope of the present invention as defined by the appended claims.

What is claimed is:

1. A heating apparatus for a vehicle having a passenger compartment and a driving source for driving the vehicle, said heating apparatus comprising:
    circuit means for forming a fluid circuit through which fluid for cooling said driving source circulates;
    a pump unit for circulating fluid in said fluid circuit;
    a heat exchanger, disposed in said fluid circuit, for heating air blown into the passenger compartment by using fluid for cooling said driving source as a heating source;
    a throttle member, disposed in a fluid passage of said cooling water circuit, for adjusting an opening area of said fluid passage;
    determining means for determining whether or not it is necessary to change temperature of fluid circulating in said fluid circuit; and
    throttle control means for controlling said throttle member to reduce said opening area of said fluid passage of said fluid circuit, when said determining means determines that it is necessary to increase the temperature of fluid in said fluid circuit.

2. The heating apparatus according to claim 1, wherein:
    said determining means includes pressure detecting means for detecting pressure in said fluid circuit at an upstream side of said throttle member, and target pressure calculating means for calculating a target pressure in said fluid circuit at the upstream side of said throttle member; and
    said determining means determines that it is necessary to increase the temperature of fluid in said fluid circuit, when the target pressure calculated by said target pressure calculating means is higher than the pressure detected by said pressure detecting means.

3. The heating apparatus according to claim 1, wherein said throttle control means controls said throttle member to increase said opening area of said fluid passage of said fluid circuit, when said determining means determines that it is necessary to decrease the temperature of fluid in said fluid circuit.

4. The heating apparatus according to claim 1, wherein said throttle member is disposed in said fluid circuit at a fluid discharge side of said pump unit.

5. The heating apparatus according to claim 1, wherein said pump unit includes a first pump driven by said driving source of the vehicle, and a second pump disposed separately from said first pump.

6. The heating apparatus according to claim 5, further comprising
    a power transmission unit for transmitting power of said driving source to said second pump,
    wherein said second pump is operated when the power of said driving source is transmitted to said second pump through said power transmission unit.

7. The heating apparatus according to claim 5, further comprising
    an electrical motor driven by a battery mounted on the vehicle,
    wherein said second pump is driven by said electrical motor.

8. The heating apparatus according to claim 5, further comprising
    second pump control means for controlling operation of said second pump,
    wherein said second pump is controlled by said second pump control means to be operated, during a heating operation for heating the passenger compartment.

9. The heating apparatus according to claim 8, wherein said second pump is controlled by said second pump control means to be operated, when power from said driving source is lower than a predetermined value during said heating operation.

10. The heating apparatus according to claim 5, wherein said fluid circuit has a bypass passage through which fluid from said first pump bypasses said second pump.

11. The heating apparatus according to claim 10, further comprising:
    a switching unit for opening and closing said bypass passage; and
    bypass passage control means which controls said switching unit to close said bypass passage so that fluid flows into said second pump, during a heating operation for heating the passenger compartment.

12. The heating apparatus according to claim 11, wherein said switching unit closes said bypass passage so that fluid flows into said second pump, when power of said driving source is lower than a predetermined value during said heating operation.

13. The heating apparatus according to claim 5, wherein said throttle member is disposed at a fluid discharge side of said second pump.

14. The heating apparatus according to claim 1, wherein said driving source is a fluid-cooled engine.

15. The heating apparatus according to claim 14, wherein said throttle control means controls said throttle member to reduce said opening area of said fluid passage of said fluid circuit, when a rotation speed of said engine is lower than a predetermined speed during a heating operation for heating the passenger compartment.

16. The heating apparatus according to claim 1, wherein said pump unit is a volume type pump.

17. The heating apparatus according to claim 1, wherein:
   said pump unit is a regenerative pump including
      a shaft rotatably disposed,
      an impeller rotated integrally with said shaft, said impeller having a plurality of recess portions each of which is recessed in a longitudinal direction of said shaft to have an approximate bowl shape, and
      a pump housing for accommodating said impeller, said pump housing has ring-like fluid passages recessed in the longitudinal direction of said shaft at positions opposite to said recess portions;
   said recess portions of said impeller and said fluid passages of said pump housing forms a plurality of spaces;
   each of spaces has a first sectional longest dimension in a first direction parallel to the longitudinal direction of said shaft, and a second sectional longest dimension in a second direction perpendicular to the longitudinal direction of said shaft; and
   said first sectional longest dimension is larger than said second sectional longest dimension.

18. The heating apparatus according to claim 1, wherein said throttle control means controls a throttle degree of said throttle member in accordance with a degree necessary for increasing the temperature of fluid in said fluid circuit.

* * * * *

UNITED STATES PATENT AND TRADEMARK OFFICE
CERTIFICATE OF CORRECTION

PATENT NO.    : 6,260,766 B1                                                Page 1 of 1
DATED         : July 17, 2001
INVENTOR(S)   : Toshi Morikawa et al.

It is certified that error appears in the above-identified patent and that said Letters Patent is hereby corrected as shown below:

<u>Title page,</u>
Item [30], Foreign Application Priority Data, JP No. 11-059255
Date "Jun. 5, 1999" should be -- Mar. 5, 1999 --

Signed and Sealed this

Eleventh Day of June, 2002

Attest:

Attesting Officer

JAMES E. ROGAN
*Director of the United States Patent and Trademark Office*